US009001874B2

(12) United States Patent
Nagata et al.

(10) Patent No.: US 9,001,874 B2
(45) Date of Patent: Apr. 7, 2015

(54) FEEDBACK METHOD, MOBILE TERMINAL APPARATUS AND RADIO BASE STATION APPARATUS

(75) Inventors: Satoshi Nagata, Tokyo (JP); Yuichi Kakishima, Tokyo (JP); Hidekazu Taoka, Tokyo (JP); Katsutoshi Kusume, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 21 days.

(21) Appl. No.: 13/877,174

(22) PCT Filed: Oct. 3, 2011

(86) PCT No.: PCT/JP2011/072756
§ 371 (c)(1),
(2), (4) Date: May 1, 2013

(87) PCT Pub. No.: WO2012/046688
PCT Pub. Date: Apr. 12, 2012

(65) Prior Publication Data
US 2013/0215988 A1 Aug. 22, 2013

(30) Foreign Application Priority Data
Oct. 4, 2010 (JP) .................................. 2010-225013

(51) Int. Cl.
*H04B 1/00* (2006.01)
*H04B 7/24* (2006.01)
(Continued)

(52) U.S. Cl.
CPC ............ *H04B 7/0456* (2013.01); *H04B 7/0452* (2013.01); *H04B 7/063* (2013.01); *H04B 7/0639* (2013.01); *H04L 25/03343* (2013.01);
(Continued)

(58) Field of Classification Search
USPC ......... 375/219, 220, 221, 222, 295, 296, 297, 375/316, 318, 324, 328, 340, 346, 349, 354, 375/356, 258, 348, 347, 299, 285, 211; 370/310, 241, 246, 249; 455/24, 19, 455/21, 20, 69, 68, 60, 63.1, 126, 91, 39, 455/500, 70, 73, 95, 101, 103, 120, 130
See application file for complete search history.

(56) References Cited

U.S. PATENT DOCUMENTS

2009/0017769 A1* 1/2009 Chen et al. ...................... 455/69
2011/0105164 A1* 5/2011 Lim et al. ...................... 455/501
(Continued)

OTHER PUBLICATIONS

International Search Report issued in PCT/JP2011/072756 mailed Nov. 15, 2011 (4 pages).
(Continued)

*Primary Examiner* — Sam K Ahn
*Assistant Examiner* — Linda Wong
(74) *Attorney, Agent, or Firm* — Osha Liang LLP

(57) ABSTRACT

The present invention makes it possible to generate precoding weights reliably, even in downlink MIMO transmission using a plurality of transmitting antennas. The present invention includes: a first feedback information selection section (109) that, in a mode to include a PTI in a PUCCH and feed back the PTI to a radio base station apparatus for downlink MIMO transmission using a plurality of transmitting antennas, selects the same RI as the last RI that was fed back, when the value of the PTI is changed from 0 to 1; a multiplexer (115) that multiplexes the RI and the PTI after the change on a subframe; and a transmission section that transmits the multiplex signal to the radio base station apparatus by the PUCCH.

12 Claims, 9 Drawing Sheets

(51) Int. Cl.
- *H04B 7/04* (2006.01)
- *H04L 25/03* (2006.01)
- *H04B 7/06* (2006.01)
- *H04W 16/28* (2009.01)
- *H04W 24/10* (2009.01)

(52) U.S. Cl.
CPC ...... *H04L2025/03808* (2013.01); *H04W 16/28* (2013.01); *H04W 24/10* (2013.01); *H04L 25/03949* (2013.01); *H04B 7/0478* (2013.01); *H04B 7/0636* (2013.01); *H04B 7/065* (2013.01)

(56) References Cited

U.S. PATENT DOCUMENTS

| | | | | |
|---|---|---|---|---|
| 2011/0128942 | A1* | 6/2011 | Kim et al. | 370/336 |
| 2012/0063500 | A1* | 3/2012 | Wang et al. | 375/224 |
| 2012/0076024 | A1* | 3/2012 | Ko et al. | 370/252 |
| 2013/0114763 | A1* | 5/2013 | Park | 375/296 |
| 2013/0182671 | A1* | 7/2013 | Kakishima et al. | 370/329 |
| 2013/0188623 | A1* | 7/2013 | Chen et al. | 370/336 |
| 2013/0230007 | A1* | 9/2013 | Nagata et al. | 370/329 |
| 2013/0287139 | A1* | 10/2013 | Zhu et al. | 375/295 |
| 2013/0301560 | A1* | 11/2013 | Geirhofer et al. | 370/329 |
| 2013/0322361 | A1* | 12/2013 | Ko et al. | 370/329 |
| 2014/0064397 | A1* | 3/2014 | Ko et al. | 375/267 |
| 2014/0086285 | A1* | 3/2014 | Yang et al. | 375/219 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

* cited by examiner

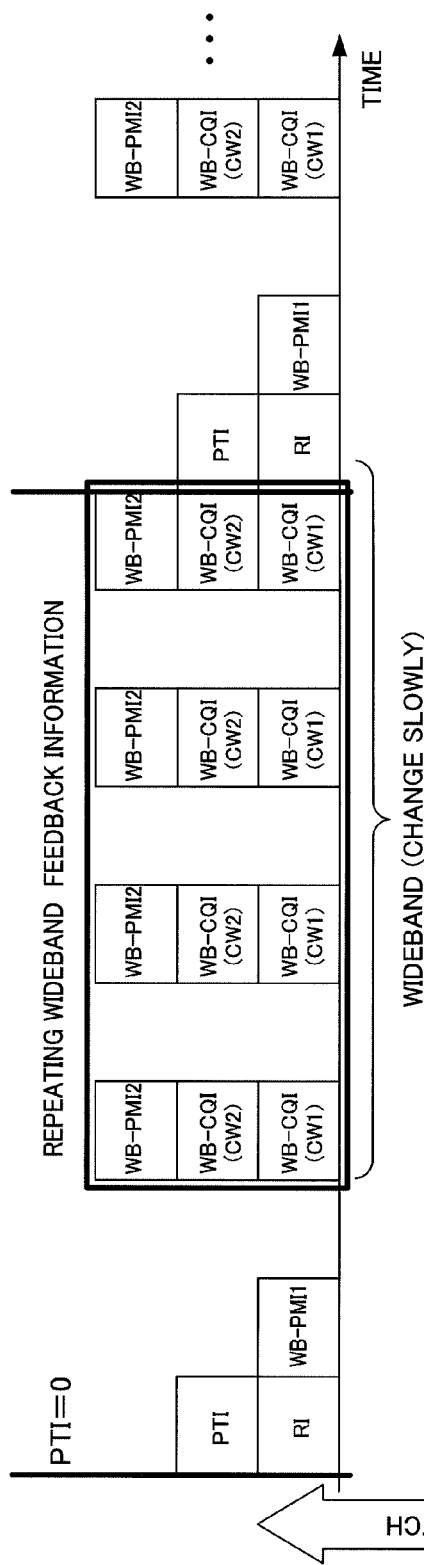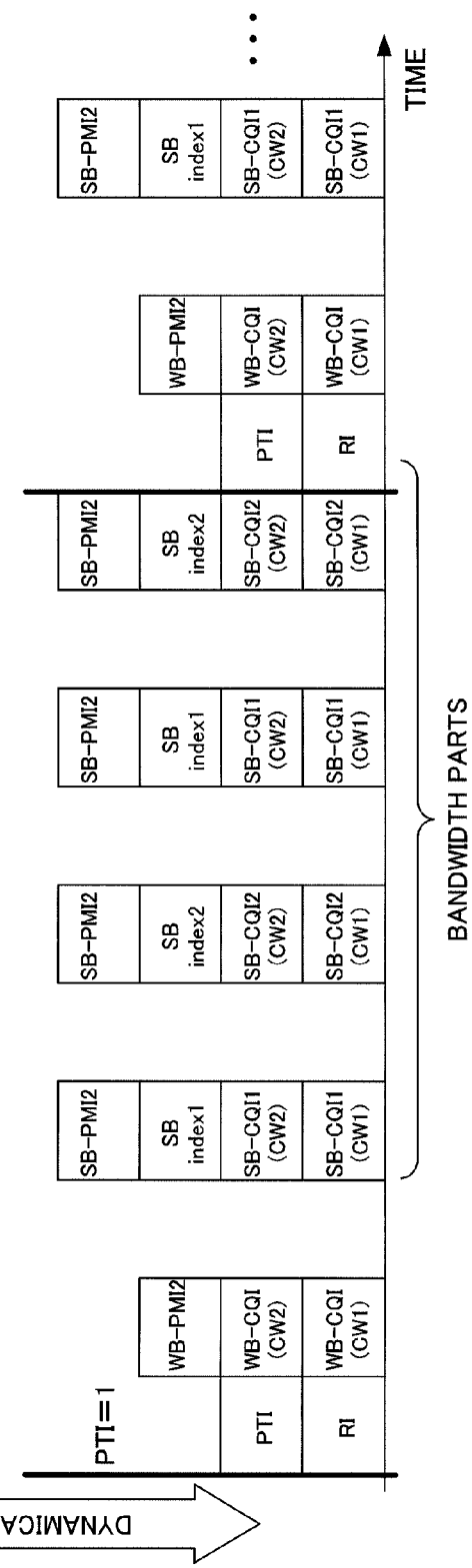

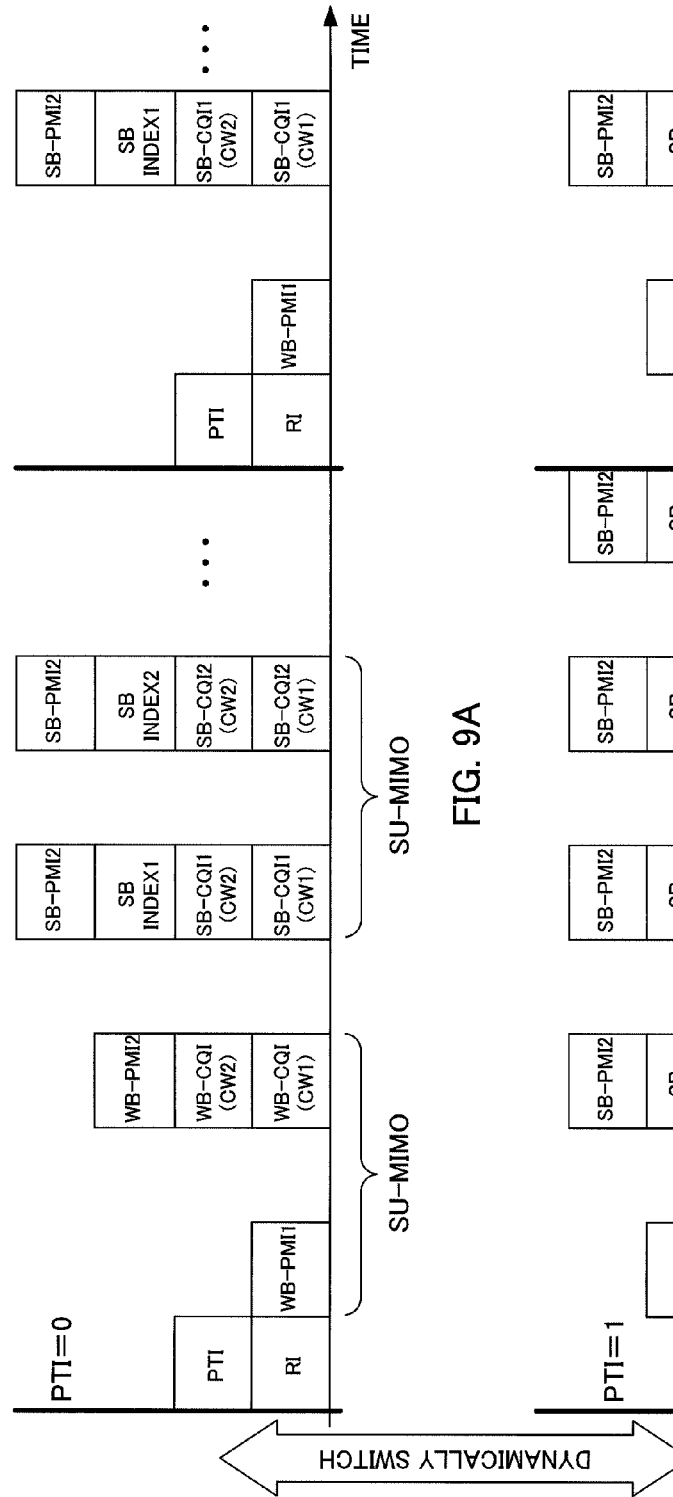
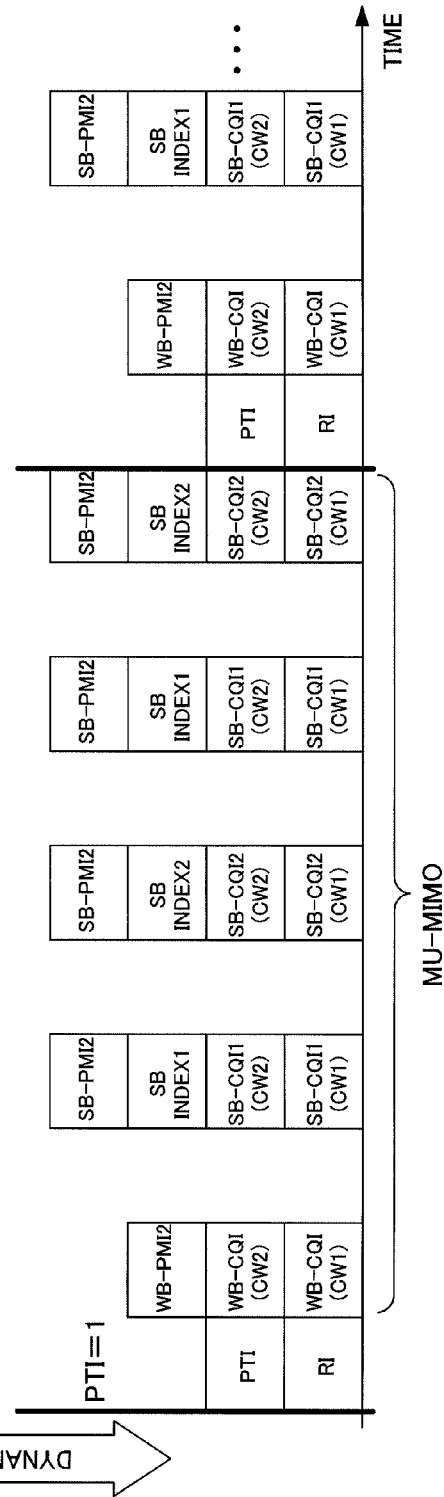
FIG. 9A
FIG. 9B

FEEDBACK METHOD, MOBILE TERMINAL APPARATUS AND RADIO BASE STATION APPARATUS

TECHNICAL FIELD

The present invention relates to a feedback method, a mobile terminal apparatus and a radio base station apparatus. More particularly, the present invention relates to a feedback method, a mobile terminal apparatus and a radio base station apparatus that support multi-antenna transmission.

BACKGROUND ART

In a UMTS (Universal Mobile Telecommunications System) network, for the purposes of improving spectral efficiency and improving data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study.

In the third-generation mobile communication system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)). For example, in LTE-A, there is a plan to expand the maximum system band for LTE specifications, which is 20 MHz, to approximately 100 MHz. Also, there is a plan to increase the maximum number of transmitting antennas for LTE specifications, which is four transmitting antennas, to eight transmitting antennas.

Also, in a system of the LTE scheme (LTE system), a MIMO (Multi Input Multi Output) system is proposed (see, for example, non-patent literature 1), as a radio communication technique to transmit and receive data by a plurality of antennas and improve the data rate (spectral efficiency). In the MIMO system, a plurality of transmitting/receiving antennas are provided in the transmitter/receiver, so that different transmission information sequences are transmitted from different transmitting antennas, at the same time. On the other hand, on the receiver side, taking advantage of the fact that fading variation is produced between transmitting/receiving antennas, by separating and detecting the information sequences that have been transmitted at the same time, it is possible to increase the data rate (spectral efficiency).

Also, in the LTE system, single-user MIMO (SU-MIMO), in which all the transmission information sequences that are transmitted from different transmitting antennas at the same time are directed to the same user, and multiple-user MIMO (MU-MIMO), in which transmission information sequences that are transmitted from different transmitting antennas are directed to different users, are defined. In these SU-MIMO transmission and MU-MIMO transmission, on the receiver side, an optimal PMI is selected from a codebook, in which a plurality of amounts of phase/amplitude control to be set in the antennas of the transmitter (precoding weights) and PMIs (Precoding Matrix Indicators) to be associated with the precoding weights, are defined on a per rank basis, and fed back to the transmitter, and, furthermore, an RI (Rank Indicator) to indicate an optimal rank is selected and fed back to the transmitter. On the transmitter side, based on the PMI and RI that are fed back from the receiver, the precoding weight for each transmitting antenna is specified, precoding is performed, and transmission information sequences are transmitted.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

As described above, in LTE-A, there is a plan to expand the maximum number of transmitting antennas to eight transmitting antennas. Then, in downlink MIMO transmission using eight transmitting antennas, precoding weights are generated from two types of PMIs that are selected from two different codebooks. Consequently, cases might occur where it is not possible to generate precoding weights unless two types of PMIs are both fed back.

The present invention has been made in view of the above, and it is therefore an object of the present invention to provide a feedback method, a mobile terminal apparatus and a radio base station apparatus whereby precoding weights can be generated reliably even in downlink MIMO transmission using a plurality of transmitting antennas.

Solution to Problem

A feedback method according to the present invention includes a PTI (Precoder Type Indicator) in a physical uplink control channel and feeds back the PTI to a radio base station apparatus for downlink MIMO transmission using a plurality of transmitting antennas, and this feedback method includes the steps of: selecting the same RI (Rank Indicator) as the last RI that was fed back, when the value of the PTI is changed from 0 to 1; multiplexing the RI and the PTI after the change on a subframe; and transmitting a multiplex signal to the radio base station apparatus by the physical uplink control channel.

A mobile terminal apparatus according to the present invention includes: a feedback information selection section, in a mode to include a PTI in a physical uplink control channel and feed back the PTI to a radio base station apparatus for downlink MIMO transmission using a plurality of transmitting antennas, configured to select the same RI as the last RI that was fed back, when the value of the PTI is changed from 0 to 1; a multiplexing section configured to multiplex the RI and the PTI after the change on a subframe; and a transmission section that transmits a multiplex signal to the radio base station apparatus by the physical uplink control channel.

A radio base station apparatus according to the present invention includes a PTI in a physical uplink control channel and feeds back the PTI to a radio base station apparatus for downlink MIMO transmission using a plurality of transmitting antennas, and this radio base station apparatus includes: a storage section configured to store in advance a virtual PMI to be used as a wideband first PMI, depending on an RI; a receiving section configured to receive a signal by the uplink control channel; an acquisition section, when feedback information to the effect that a different RI from the last RI that was fed back is selected and 1 is selected for the value of the PTI is detected, configured to acquire the virtual PMI to match the RI after the change from the storage section; and a weight generating section configured to generate a precoding weight using the virtual PMI to match the RI after the change.

Technical Advantage of the Invention

According to the present invention, even in downlink MIMO transmission using a plurality of transmitting antennas, it is possible to generate precoding weights reliably.

BRIEF DESCRIPTION OF DRAWINGS

FIG. 5 is a diagram to explain PMI/CQI/RI feedback using a PUCCH in downlink MIMO transmission using eight transmitting antennas;

FIG. 9 is a diagram to explain a feedback method using a PUCCH in a mobile communication system according to embodiment 2 of the present invention.

DESCRIPTION OF EMBODIMENTS

Figure 1:
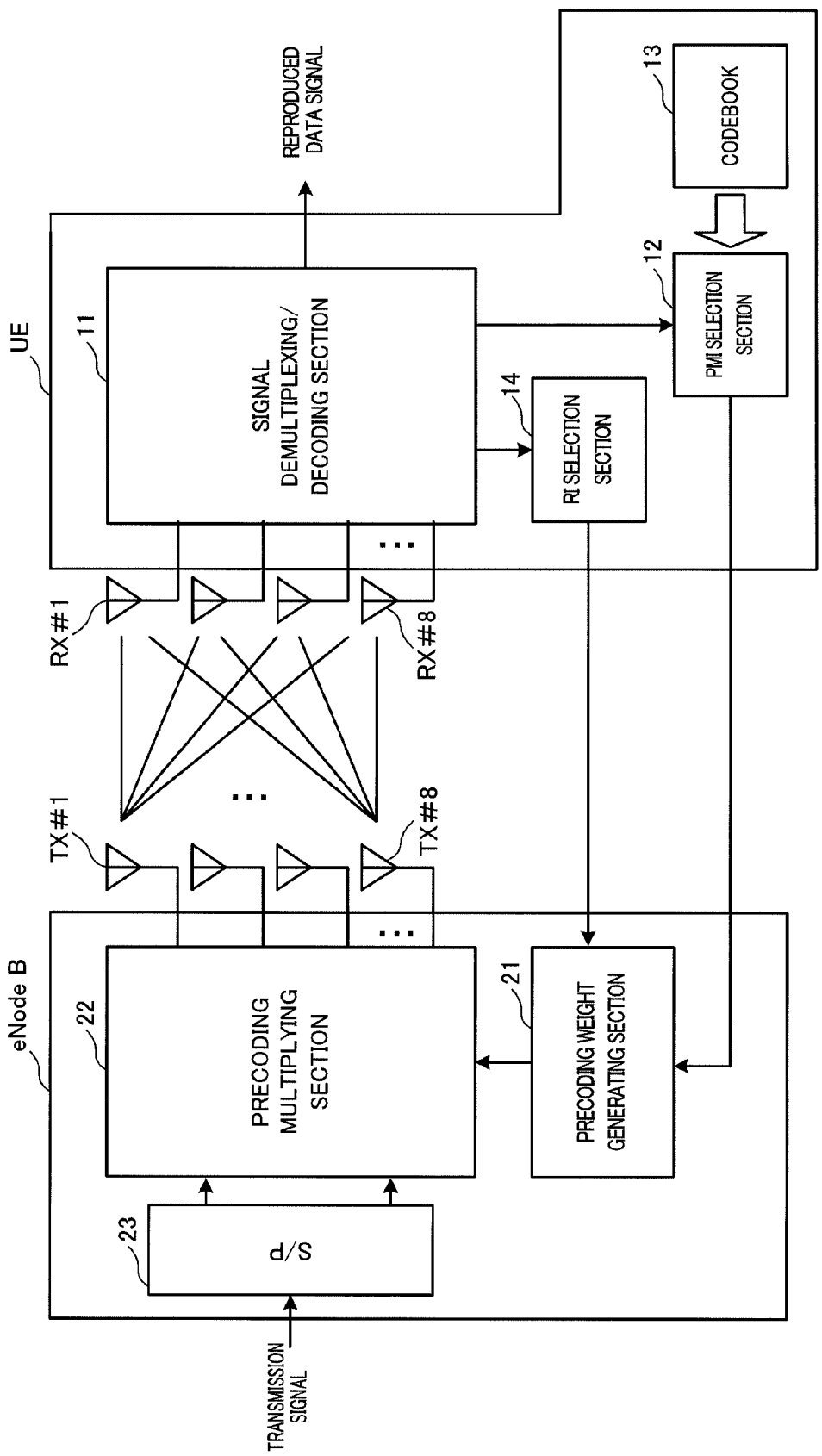
FIG. 1 is a conceptual diagram of a MIMO system adopting a feedback method according to the present invention.

Now, an embodiment of the present invention will be described below in detail with reference to the accompanying drawings. First, precoding in downlink MIMO transmission that is performed in the LTE-A system will be described based on the MIMO system shown in FIG. 1. FIG. 1 is a conceptual diagram of a MIMO system adopting a feedback method according to the present invention. Note that, with the MIMO system shown in FIG. 1, a case is illustrated where a radio base station apparatus (hereinafter simply referred to as "base station apparatus") eNodeB and a mobile terminal apparatus UE each have eight antennas.

In precoding in downlink MIMO transmission, a mobile terminal apparatus UE measures the amount of channel variation using a received signal from each antenna, and, based on the measured amount of channel variation, selects a PMI (Precoding Matrix Indicator) and an RI (Rank Indicator) corresponding to the amount of phase/amplitude control (precoding weight) that maximizes the throughput (or the received SINR (Signal to Interference and Noise Ratio)) after transmission data from each transmitting antenna of the base station apparatus eNodeB is combined. Then, the selected PMI and RI are fed back to the base station apparatus eNodeB on the uplink with a CQI (Channel Quality Indicator) that represents channel quality information. The base station apparatus eNodeB performs precoding of transmission data based on the PMI and RI that are fed back from the mobile terminal apparatus UE, and, after that, performs information transmission from each antenna.

In the mobile terminal apparatus UE shown in FIG. 1, a signal demultiplexing/decoding section 11 demultiplexes and decodes the control channel signal and data channel signal included in the received signals received via receiving antenna RX #1 to RX #8. By performing the decoding process in the signal demultiplexing/decoding section 11, the data channel signal for the mobile terminal apparatus UE is reproduced. A PMI selection section 12 selects a PMI according to the channel state estimated by a channel estimation section, which is not illustrated. At this time, the PMI selection section 12 selects an optimal PMI from a codebook 13, in which N precoding weights (precoding matrix) that are known at both the mobile terminal apparatus UE and the base station apparatus eNodeB per rank, and PMIs associated with these precoding weights. An RI selection section 14 selects an RI according to the channel state estimated by the channel estimation section. These PMI and RI are transmitted to the base station apparatus eNodeB, with a CQI which represents channel quality information, as feedback information.

Meanwhile, in the base station apparatus eNodeB shown in FIG. 1, a precoding weight generating section 21 generates precoding weights based on the PMI and RI that are fed back from the mobile terminal apparatus UE. A precoding multiplying section 22 controls (shifts) the phase/amplitude, for each of transmitting antennas TX #1 to TX #8, by multiplying the transmission signal having been subjected to parallel conversion in a serial/parallel conversion section (S/P) 23, by precoding weights. By this means, transmission data to which a phase/amplitude shift has been applied is transmitted from eight transmitting antennas TX #1 to TX #8.

Here, in such downlink MIMO transmission, the method of feeding back channel information (PMI/CQI/RI: hereinafter referred to as "feedback information" as appropriate) from the mobile terminal apparatus to the base station apparatus eNodeB will be described. FIG. 2 is a diagram for explaining a method of feeding back feedback information from the mobile terminal apparatus UE to the base station apparatus eNodeB through a PUCCH (Physical Uplink Control Channel) in downlink MIMO transmission. FIG. 2 shows a case of feeding back feedback information periodically (hereinafter referred to as "periodic feedback").

Figure 2A:
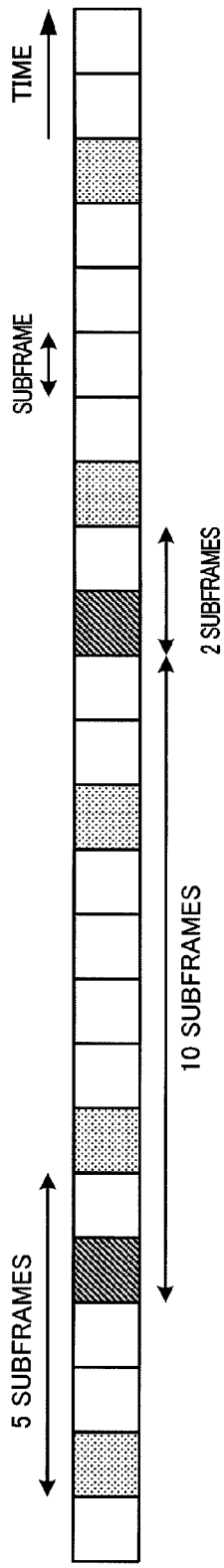
FIG. 2 is a diagram to explain PMI/CQI/RI feedback using a PUCCH.
Figure 2B:
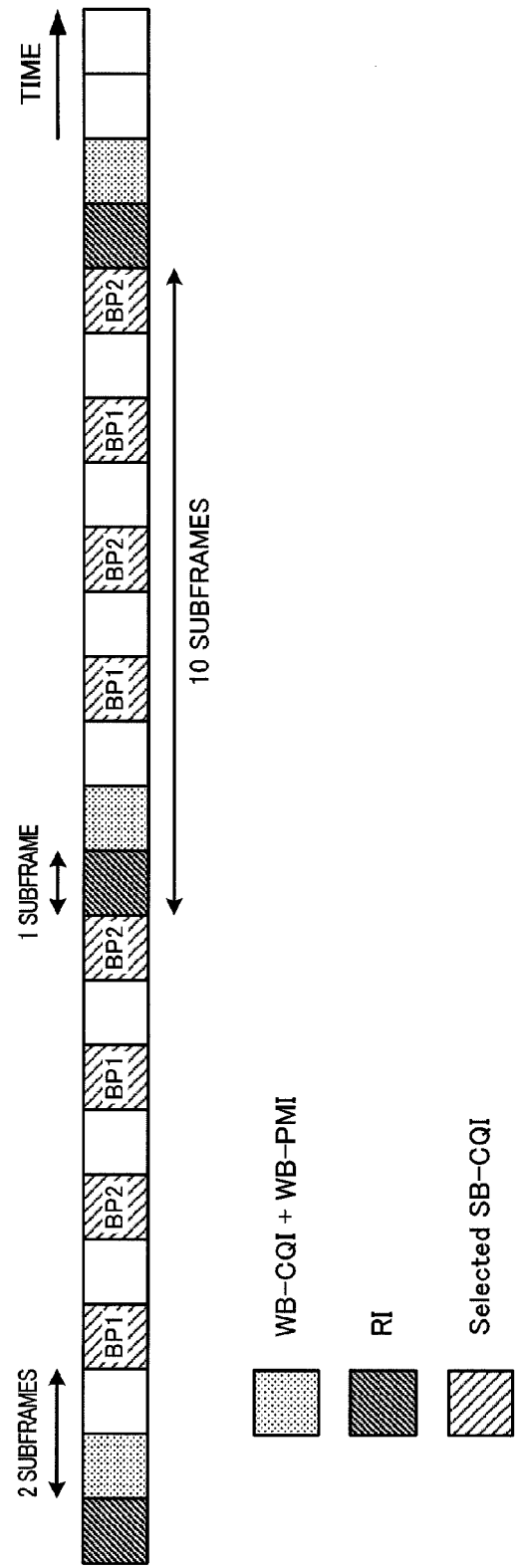

In periodic feedback, as shown in FIG. 2A, there is a mode to feed back a wideband CQI (WB-CQI) and a wideband PMI (WB-PMI), and an RI, in separate subframes, and, as shown FIG. 2B, there is a mode to feed back a WB-CQI and a WB-PMI, an RI, and a selected subband CQI (SB-CQI) in separate subframes. In the modes shown in FIG. 2A and FIG. 2B, feedback information (PMI/CQI, RI) is fed back using the PUCCH.

In the mode shown in FIG. 2A, the WB-PMI and WB-CQI, and the RI, are fed back in different subframes (TTIs: Transmission Time Intervals). FIG. 2A shows a case where the feedback mode of channel information of the PUCCH is mode 1-1, the cycle of the WB-PMI/WB-CQI is five subframes, and the cycle of the RI is twice the cycle of the WB-PMI/WB-CQI (ten subframes), and the subframes to feed back the RI are two subframes offset from the subframes to feed back the WB-PMI/WB-CQI. In this case, the WB-PMI/WB-CQI and the RI are separately encoded and fed back.

Meanwhile, in the mode shown in FIG. 2B, the WB-PMI and the WB-CQI, the RI, and the SB-CQI are fed back in different subframes (TTIs). FIG. 2B shows a case where the feedback mode of channel information of the PUCCH is mode 2-1, the cycle of the WB-PMI/WB-CQI (SB-CQI) is two subframes, the cycle of the RI is five times (ten subframes) the cycle of the WB-PMI/WB-CQI, and the subframes to feed back the RI are one subframe offset from the subframes to feed back the WB-PMI/WB-CQI.

Also, FIG. 2B shows a case where the number of subbands (bandwidth parts (BPs)) is two, the offset of subframes to feed back the SB-CQI with respect to subframes to feed back the WB-PMI/WB-CQI is two subframes, and, during a feedback cycle of the WB-PMI/WB-CQI, the SB-CQI of the same subband is fed back twice. In this case, the WB-PMI/WB-CQI, the RI, and the SB-CQI are separately encoded and fed back.

Figure 3:
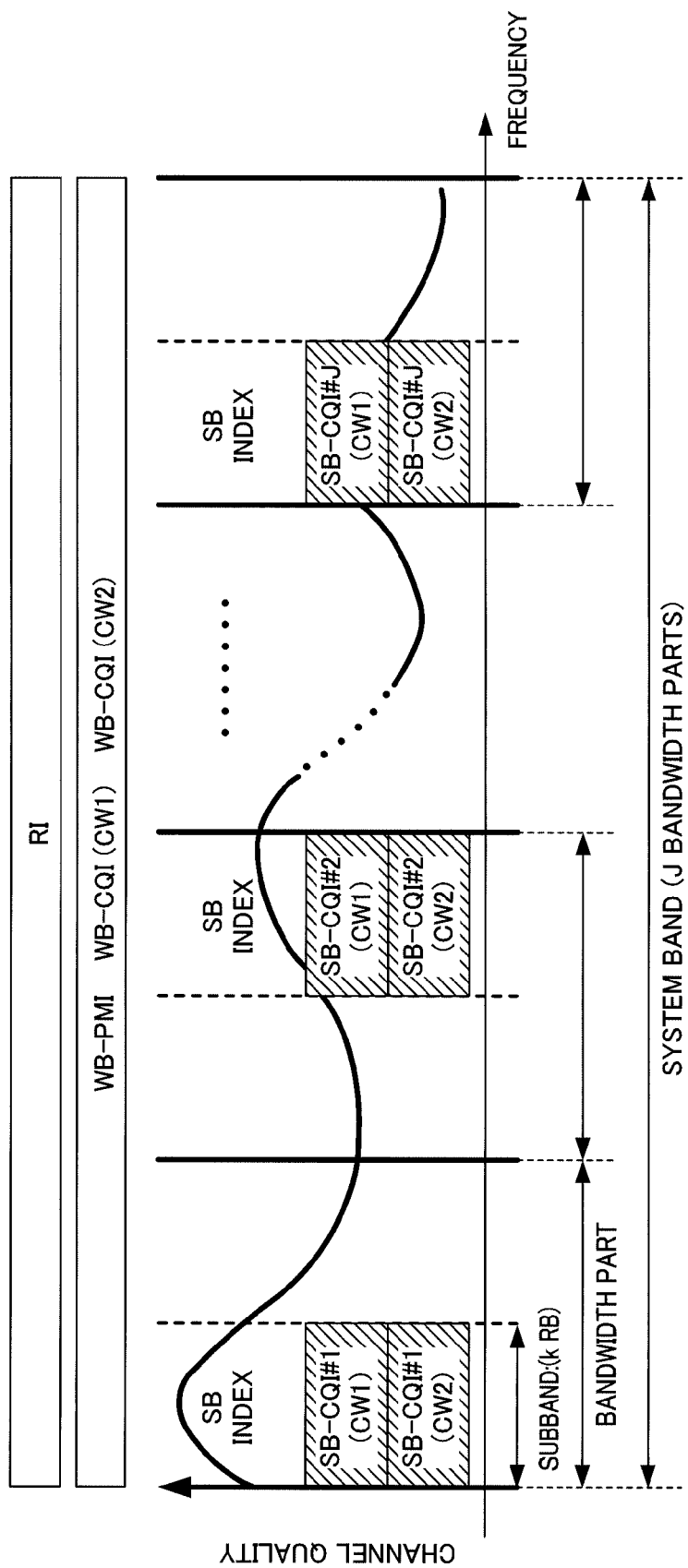
FIG. 3 is a diagram to explain subband CQI feedback using a PUCCH.

FIG. 3 is a diagram for explaining subband CQI feedback using the PUCCH. Note that FIG. 3 shows a case where the system band is formed with J bandwidth parts (BPs) and where each BP is formed with two subbands. Also, in FIG. 3, in order to make it possible to select an adequate MCS (Modulation and Coding Scheme) on a per codeword (CW) basis in the base station apparatus NodeB, CQIs that correspond to two CWs (CW 1 and CW 2) are fed back.

As shown in FIG. 3, in subband CQI feedback (3GPP TS36.213) using the PUCCH in feedback mode 2-1, the subband to show the highest received SINR in each BP is selected, and the CQI in that subband is fed back to the base station apparatus eNodeB with an SB index. Furthermore, each BP's information is fed back cyclically. Note that the RI, WB-PMI and WB-CQIs (CW 1 and CW 2) are fed back in accordance with the system band.

Figure 4:
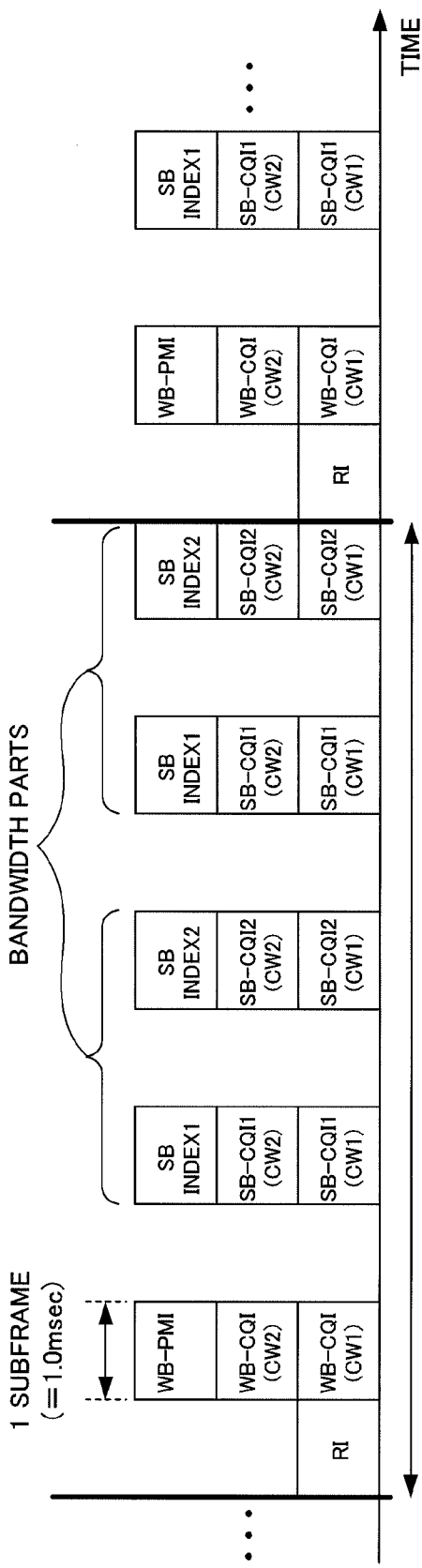
FIG. 4 is a diagram to explain PMI/CQI/RI feedback using a PUCCH.

To show in the example of FIG. 2B, the RI, WB-PMI, WB-CQIs and SB-CQIs (CW 1 and CW 2) shown in FIG. 3 are allocated to each subframe as shown in FIG. 4. Note that, in FIG. 4, for ease of explanation, a subframe where the RI is allocated is referred to as the first subframe. As shown in FIG. 4, the RI is fed back in the first subframe, and the WB-PMI and WB-CQIs (CW 1 and CW 2) are fed back in the second subframe. The SB-CQIs are fed back in the fourth, sixth, eighth and tenth subframes, with SB indices. Here, a case is shown where, in the fourth and eighth subframes, SB-CQIs 1 (CW 1 and CW 2) are fed back with SB index 1, and where, in the sixth and tenth subframes, SB-CQIs 2 (CW 1 and CW 2) are fed back with SB index 2.

Now, as described above, in downlink MIMO transmission using eight transmitting antennas, precoding weights are generated from two types of PMIs that are selected from two different codebooks (hereinafter referred to as "double codebook"). Here, the double codebook is formed with the first codebook for a wideband/long cycle, and a second codebook for a subband/short cycle. In downlink MIMO transmission using eight transmitting antennas, a WB-PMI (WB-PMI 1) selected from the first codebook and a SB-PMI (SB-PMI 2) selected from the second codebook are fed back to the base station apparatus eNodeB. Note that, although the second codebook is for a subband/short cycle, it is also possible to select a WB-PMI (WB-PMI 2), in addition to SB-PMI 2. Note that WB-PMI 1 constitutes the wideband first PMI.

In this feedback mode 2-1 in downlink MIMO transmission using eight transmitting antennas, precoding weights are determined from feedback information in three subframes that is adjusted based on the last RI that was fed back. The feedback information in these three subframes may be referred to as "three-subframe report." This "three-subframe report" is formed with report 1 to report 3, each defining feedback information.

In report 1, an RI and one-bit PTI (Precoder Type Indicator) are defined. In report 2 and report 3, information that matches the value of the PTI in report 1 is defined. In report 2, when the value of the PTI is "0," WB-PMI 1 that is selected from the first codebook is fed back, and, when the value of the PTI is "1," WB-CQIs and WB-PMI 2 that is selected from the second codebook are fed back. In report 3, when the value of the PTI is "0," WB-CQIs and WB-PMI 2 that is selected from the second codebook are fed back, and, when the value of the PTI is "1," SB-CQIs and SB-PMI 2 that is selected from the second codebook are fed back. That is to say, by changing the value of the PTI, it is possible to switch the information to feed back in report 3 between feedback information related to a wideband and feedback information related to a subband.

FIG. 5 is a diagram to explain PMI/CQI/RI feedback using the PUCCH in downlink MIMO transmission using eight transmitting antennas. FIG. 5A shows the feedback information when PTI=0, and FIG. 5B shows the feedback information when PTI=1. Note that FIG. 5 shows a case where the number of subbands (BPs) is two. Also, in FIG. 5, for ease of explanation, a subframe where the RI is allocated is referred to as the first subframe.

When PTI=0, as shown in FIG. 5A, an RI and a PTI (PTI=0) are fed back in the first subframe (report 1). Also, in the second subframe, WB-PMI 1 that is selected from the first codebook is fed back (report 2). Furthermore, in the fourth, sixth, eighth and tenth subframes, WB-CQIs (CW 1 and CW 2) and WB-PMI 2 that is selected from the second codebook are fed back (report 3).

When PTI=1, as shown in FIG. 5B, RI and PTI (PTI=1) are fed back in the first subframe (report 1). Also, in the second subframe, WB-CQIs (CW 1 and CW 2) and WB-PMI 2 that is selected from the second codebook are fed back (report 2). Furthermore, in the fourth, sixth, eighth and tenth subframes, SB-CQIs and SB indices, and SB-PMI 2 that is selected from the second codebook, are fed back (report 3). Here, a case is shown where, in the fourth and eighth subframes, SB-CQIs 1 (CW 1 and CW 2), SB index 1 and SB-PMI 2 are fed back, and, in the sixth and tenth subframes, SB-CQIs 2 (CW 1 and CW 2), SB index 2 and SB-PMI 2 are fed back.

As described above, in feedback mode 2-1 in downlink MIMO transmission using eight transmitting antennas, precoding weights are determined from feedback information (three-subframe report) in three subframes that is adjusted based on the last (most recent) RI that was fed back. The precoding weights are generated by multiplying WB-PMI 1 that is included in the three-subframe report by WB-PMI 2 (or SB-PMI 2) (WB-PMI 1×WB-PMI 2 (or SB-PMI 2)). Consequently, it is not possible to generate precoding weights using only one of WB-PMI 1 and WB-PMI 2 (or SB-PMI 2).

In feedback mode 2-1 in downlink MIMO transmission using eight transmitting antennas, as shown in FIG. 5, it is possible to switch feedback information dynamically by changing the value of the PTI included in report 1. However, when the value of the PTI is changed from 0 to 1 and the rank which the RI indicates also changes, the situation might occur where information related to WB-PMI 1 corresponding to the rank after the change is missing, and therefore it is not possible to generate adequate precoding weights.

The present inventors have focused on the fact that it is not possible to generate precoding weights due to loss of WB-PMI 1 when the value of the PTI is changed on a dynamic basis, and arrived at the present invention by finding out that it is possible to generate precoding weights reliably even in downlink MIMO transmission using eight transmitting antennas, by preventing the value of the PTI and the rank indicated by the RI from changing at the same time, or, by maintaining WB-PMI 1 (or a PMI to match this) to use to generate precoding weights in the base station apparatus eNodeB.

That is to say, the first gist of the present invention is that, in a mode to include a PTI in a physical uplink control channel (PUCCH) and feed back the PTI to a base station apparatus eNodeB for downlink MIMO transmission using a plurality of transmitting antennas (for example, eight transmitting antennas), when the value of the PTI is changed from 0 to 1, it is possible to generate precoding weights reliably, even in downlink MIMO transmission using a plurality of transmitting antennas, by selecting the same RI as the last RI that was fed back, multiplexing that RI and the PTI after the change on a subframe, and transmitting the multiplex signal to the base station apparatus eNodeB through the physical uplink control channel.

Also, a second gist of the present invention is that, in a mode to include a PTI in a physical uplink control channel (PUCCH) and feed back the PTI to a base station apparatus eNodeB for downlink MIMO transmission using a plurality of transmitting antennas, when a different RI from the last RI that was fed back is selected, it is possible to generate precoding weights reliably, even in downlink MIMO transmission using a plurality of transmitting antennas, by selecting 0 for the value of the PTI, multiplexing that PTI and the RI after the change on a subframe, and transmitting the multiplex signal to the base station apparatus eNodeB through the physical uplink control channel.

Furthermore, a third gist of the present invention is that, in a mode to include a PTI in a physical uplink control channel (PUCCH) and feed back the PTI to a base station apparatus eNodeB for downlink MIMO transmission using a plurality of transmitting antennas, a virtual PMI to be used as WB-PMI 1 is stored in advance in the base station apparatus eNodeB in accordance with the RI, and, when a different RI from the last RI that was fed back is selected and 1 is selected for the value of the PTI, in the mobile terminal apparatus UE, it is possible to generate precoding weights reliably, even in downlink MIMO transmission using a plurality of transmitting antennas, by multiplexing the RI after the change and the PTI on a subframe, transmitting the multiplex signal to the base station apparatus eNodeB by the physical uplink control channel, and using a virtual PMI to match the RI after the change to generate precoding weights in the base station apparatus eNodeB.

Furthermore, a fourth gist of the present invention is that, in a mode to include a PTI in a physical uplink control channel (PUCCH) and feed back the PTI to a base station apparatus eNodeB for downlink MIMO transmission using a plurality of transmitting antennas, a virtual PMI to be used as WB-PMI 1 is stored in advance in the base station apparatus eNodeB in accordance with the combination of the last RI and WB-PMI 1 that were fed back and the RI after the change, and, when a different RI from the last RI that was fed back is selected and 1 is selected for the value of the PTI, in the mobile terminal apparatus UE, it is possible to generate precoding weights reliably, even in downlink MIMO transmission using a plurality of transmitting antennas, by multiplexing the RI after the change and the PTI on a subframe, transmitting the multiplex signal to the base station apparatus eNodeB by the physical uplink control channel, and using a virtual PMI to match the combination of the last RI and WB-PMI 1 that were fed back and the RI after the change, to generate precoding weights in the base station apparatus eNodeB.

Now, a plurality of examples of the present invention will be described below with reference to FIG. 5. With the feedback method using the PUCCH according to the first example of the present invention, in a mode to include and feed back a PTI to a base station apparatus eNodeB for downlink MIMO transmission using eight transmitting antennas, when the value of the PTI is changed from 0 to 1, the same RI as the last (most recent) RI that was fed back is selected, and that RI and the PTI after the change are multiplexed on a subframe.

As shown in FIG. 5, when the value of the PTI is changed from 0 to 1, given that, when the rank which the RI indicates is changed, WB-PMI 1 is not multiplexed on a subframe when PTI=1, and therefore the situation might occur where WB-PMI 1 to match the rank after the change is not fed back to the base station apparatus eNodeB. With the feedback method according to the first example, when the value of the PTI is changed from 0 to 1, the same RI as the last RI that was fed back is selected, and that RI and the PTI after the change are multiplexed on a subframe, so that it is possible to prevent the value of the PTI and the rank indicated by the RI from changing at the same time, thus preventing the situation where WB-PMI 1 is missing and making it possible to generate precoding weights reliably, in the base station apparatus eNodeB, even in downlink MIMO transmission using eight transmitting antennas.

Also, with the feedback method according to the first example, in the base station apparatus eNodeB, it is preferable to store the last WB-PMI 1 that was fed back when the value of the PTI was 0, and use this stored WB-PMI 1 to generate precoding weights. In this case, it is possible to generate precoding weights based on WB-PMI 1 which reflects a channel state that resembles the current wideband channel state the most.

With the feedback method using the PUCCH according to a second example of the present invention, in a mode to include and feed back a PTI to a base station apparatus eNodeB for downlink MIMO transmission using eight transmitting antennas, when a different RI from the last (most recent) RI that was fed back is selected, 0 is selected for the value of the PTI, that PTI and the RI after the change are multiplexed on a subframe.

As shown in FIG. 5, when a different RI from the last RI that was fed back is selected, given that, if 1 is selected for the value of the PTI, WB-PMI 1 is not multiplexed on a subframe when PTI=1, the situation might occur where WB-PMI 1 to match the rank after the change is not fed back to the base station apparatus eNodeB. With the feedback method according to the second example, when a different RI from the last RI that was fed back is selected, 0 is selected for the value of the PTI, and that PTI and the RI after the change are multiplexed on a subframe, so that it is possible to prevent the value of the PTI and the rank indicated by the RI from changing at the same time, thus preventing the situation where WB-PMI 1 is missing and making it possible to generate precoding weights reliably, in the base station apparatus eNodeB, even in downlink MIMO transmission using eight transmitting antennas.

With the feedback method using the PUCCH according to a third example of the present invention, in a mode to include and feed back a PTI to a base station apparatus eNodeB for downlink MIMO transmission using eight transmitting antennas, a virtual PMI to be used as WB-PMI 1 is stored in advance in the base station apparatus eNodeB in accordance with the RI, and, when a different RI from the last RI that was fed back is selected and 1 is selected for the value of the PTI in a mobile terminal apparatus UE, the RI after the change and the PTI are multiplexed on a subframe, the multiplex signal is transmitted to the base station apparatus eNodeB through the physical uplink control channel, and a virtual PMI to match the RI after the change is used to generate precoding weights in the base station apparatus eNodeB.

As shown in FIG. 5, when a different RI from the last RI that was fed back is selected, given that, if 1 is selected for the value of the PTI, WB-PMI 1 is not multiplexed on a subframe when PTI=1, the situation might occur where WB-PMI 1 to match the rank information after the change is not fed back to the base station apparatus eNodeB. With the feedback method according to the third example, when a different RI from the last RI that was fed back is selected and 1 is selected for the value of the PTI in a mobile terminal apparatus UE, a virtual PMI to match the RI after the change is used as WB-PMI 1 to generate precoding weights, so that it is possible to prevent the situation where WB-PMI 1 to match the RI after the change is missing, and, consequently, it is possible to generate precoding weights reliably, in the base station apparatus eNodeB, even in downlink MIMO transmission using eight transmitting antennas.

Note that the feedback method according to the third example, in the base station apparatus eNodeB, it is possible to store PMIs, as virtual PMIs, that, for example, assume WB-PMI 1 to be 0 when the rank which the RI after the change indicates is rank 1 or rank 2, assume WB-PMI 1 to be 1 when the rank which the RI after the change indicates is rank 3 or rank 4, and assume WB-PMI 1 to be 2 when the rank which the RI after the change indicates is rank 5 to rank 8.

With the feedback method according to a fourth example of the present invention, in a mode to include and feed back a PTI to a base station apparatus eNodeB for downlink MIMO transmission using eight transmitting antennas, a virtual PMI to be used as WB-PMI 1 is stored in advance in the base station apparatus eNodeB in accordance with the combination of the last RI and WB-PMI 1 that were fed back and the RI after the change, when a different RI from the last RI that was fed back is selected and 1 is selected for the value of the PTI in a mobile terminal apparatus UE, the RI after the change and the PTI are multiplexed on a subframe, the multiplex signal is transmitted to the base station apparatus eNodeB through the physical uplink control channel, and a virtual PMI to match the combination of the last RI and WB-PMI 1 that were fed back and the RI after the change is used to generate precoding weights in the base station apparatus eNodeB.

As shown in FIG. 5, when a different RI from the last RI that was fed back is selected, given that, if 1 is selected for the value of the PTI, WB-PMI 1 is not multiplexed on a subframe when PTI=1, the situation might occur where WB-PMI 1 to match the rank information after the change is not fed back to the base station apparatus eNodeB. With the feedback method according to the fourth example, when a different RI from the last RI that was fed back is selected and 1 is selected for the value of the PTI, a virtual PMI to match the combination of the last RI and WB-PMI 1 that were fed back and the RI after the change is used as WB-PMI 1 to generate precoding weights, so that it is possible to prevent the situation where WB-PMI 1 to match the RI after the change is missing, and, consequently, it is possible to generate precoding weights reliably, in the base station apparatus eNodeB, even in downlink MIMO transmission using eight transmitting antennas.

Note that, with the feedback method according to the fourth example, in the base station apparatus eNodeB, it is possible to store, as virtual PMIs, for example, PMIs that assume WB-PMI 1 to be 0 when the RI after the change is rank 1 to rank 8, the last RI that was fed back is rank 1 to rank 8 and the last WB-PMI 1 that was fed back is 0, assume WB-PMI 1 to be 1 when the RI after the change is rank 1 to rank 4, the last RI that was fed back is rank 1 or rank 2, and the last WB-PMI 1 that was fed back is 1. Likewise, it is also possible to store PMIs that assume WB-PMI 1 to be 2 when the RI after the change is rank 1 to rank 4, and the last RI that was fed back is rank 3 or rank 4, and the last WB-PMI 1 that was fed back is 1, and assume WB-PMI 1 to be 4 when the RI after the change is rank 1 to rank 4, the last RI that was fed back is rank 5 to rank 8, and the last WB-PMI 1 that was fed back is 1.

Also, it is equally possible to store PMIs that assume WB-PMI 1 to be 0 when the RI after the change is rank 5 to rank 8, the last RI that was fed back is rank 1 or rank 2, and the last WB-PMI 1 that was fed back is 1, assume WB-PMI 1 to be 1 when the RI after the change is rank 5 to rank 8, the last RI that was fed back is rank 3 or rank 4, and the last WB-PMI 1 that was fed back is 1, and assume WB-PMI 1 to be 2 when the RI after the change is rank 5 to rank 8, the last RI that was fed back is rank 5 to rank 8, and the last WB-PMI 1 that was fed back is 1. Note that these relationships of association are only examples, and it is preferable to select such WB-PMI 1 that includes a transmission beam that is formed based on the last WB-PMI 1 that was fed back.

Now, embodiments of the present invention will be described below in detail with reference to the accompanying drawings. Cases will be described here where a base station apparatus and mobile terminal apparatuses to support the LTE-A system are used.

Figure 6:
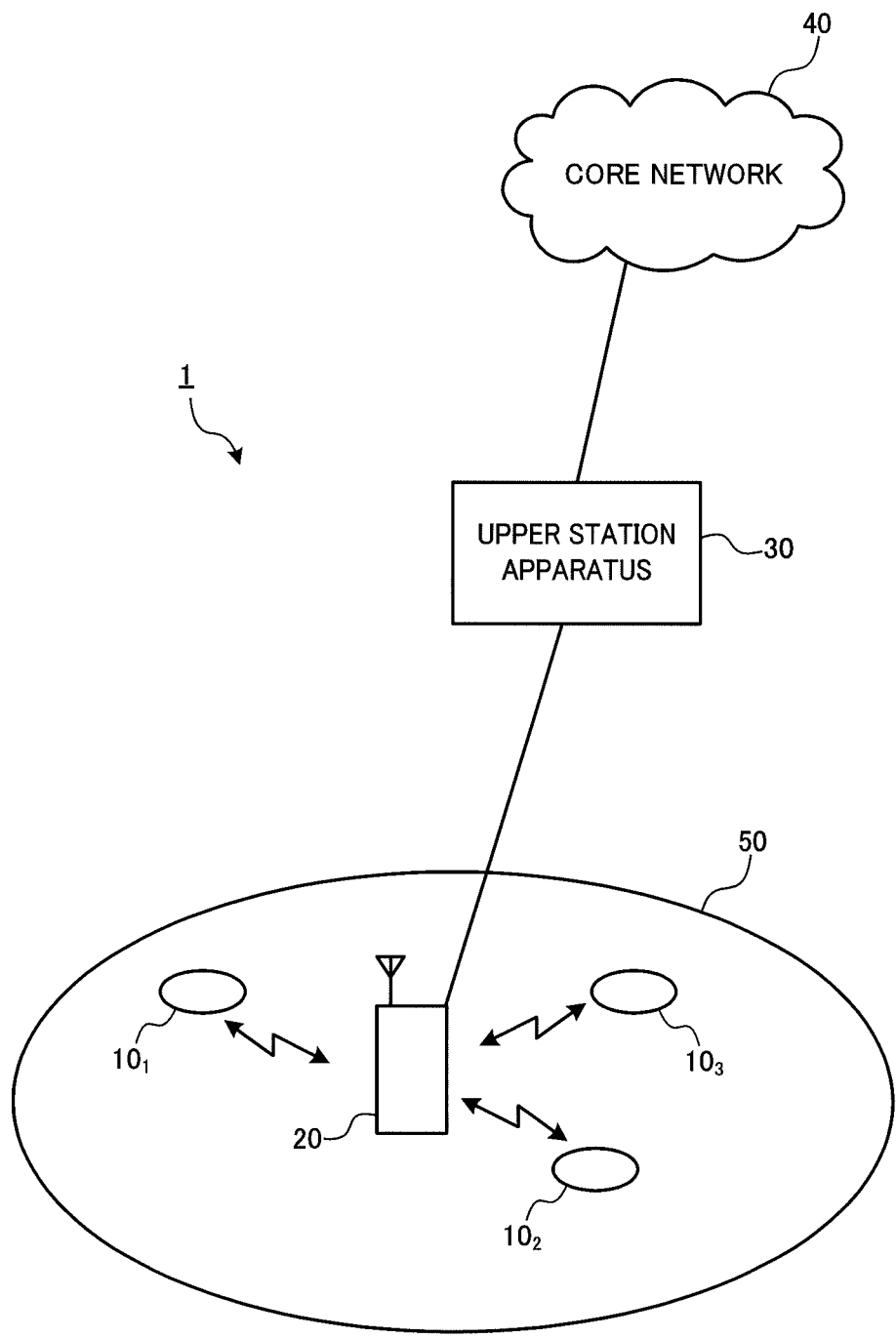
FIG. 6 is a diagram for explaining a configuration of a mobile communication system according to an embodiment of the present invention.

Referring to FIG. 6, a mobile communication system 1 having a mobile terminal apparatus (UE) 10 and a base station apparatus (eNodeB) 20 according to an embodiment of the present invention will be described. FIG. 6 is a diagram for explaining the configuration of the mobile communication system 1 having a mobile terminal apparatus 10 and a radio base station apparatus 20 according to an embodiment of the present invention. Note that the mobile communication system 1 shown in FIG. 6 is a system to accommodate, for example, the LTE system or SUPER 3G. This mobile communication system 1 may also be referred to as IMT-Advanced or may be referred to as 4G.

As shown in FIG. 6, a radio communication system 1 is configured to include a base station apparatus 20, and a plurality of mobile terminal apparatuses 10 ($10_1$, $10_2$, $10_3$, ... $10_n$, where n is an integer to satisfy n>0) that communicate with the base station apparatus 20. The base station apparatus 20 is connected with an upper station apparatus 30, and this upper station apparatus 30 is connected with a core network 40. The mobile terminal apparatus 10 communicates with the base station apparatus 20 in a cell 50. Note that the upper station apparatus 30 includes, for example, an access gateway apparatus, a radio network controller (RNC), a mobility management entity (MME) and so on, but is by no means limited to these.

The mobile terminal apparatuses ($10_1$, $10_2$, $10_3$, ... $10_n$) have the same configuration, functions and state, so that, the following description will be given with respect to "mobile terminal apparatus 10," unless specified otherwise. Also, although the mobile terminal apparatus 10 performs radio communication with the base station apparatus 20 for ease of explanation, more generally, user apparatuses (UE: User Equipment) including mobile terminal apparatuses and fixed terminal apparatuses may be used.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing, per terminal, the system band into bands formed with one or continuous resource blocks, and allowing a plurality of terminals to use mutually different bands.

Now, communication channels in the LTE system will be described. On the downlink, a PDSCH, which is used by each mobile terminal apparatus 10 on a shared basis, and downlink L1/L2 control channels (PDCCH (Physical Downlink Control CHannel), PCFICH (Physical Control Field Indicator CHannel), and PHICH (Physical Hybrid automatic repeat request Indicator CHannel)) are used. By means of this PDSCH, user data, that is, normal data signals, is transmitted. Transmission data is included in this user data. Note that the CCs and scheduling information that are allocated to the mobile terminal apparatus 10 by the base station apparatus 20 are reported to the mobile terminal apparatus 10 by the L1/L2 control channels.

On the uplink, a PUSCH (Physical Uplink Shared Channel) that is used by each mobile terminal apparatus 10 on a shared basis and a PUCCH (Physical Uplink Control Channel), which is an uplink control channel, are used. User data is transmitted by means of this PUSCH. Also, downlink radio quality information (CQI) and so on are transmitted by means of the PUCCH.

Embodiment 1

Figure 7:
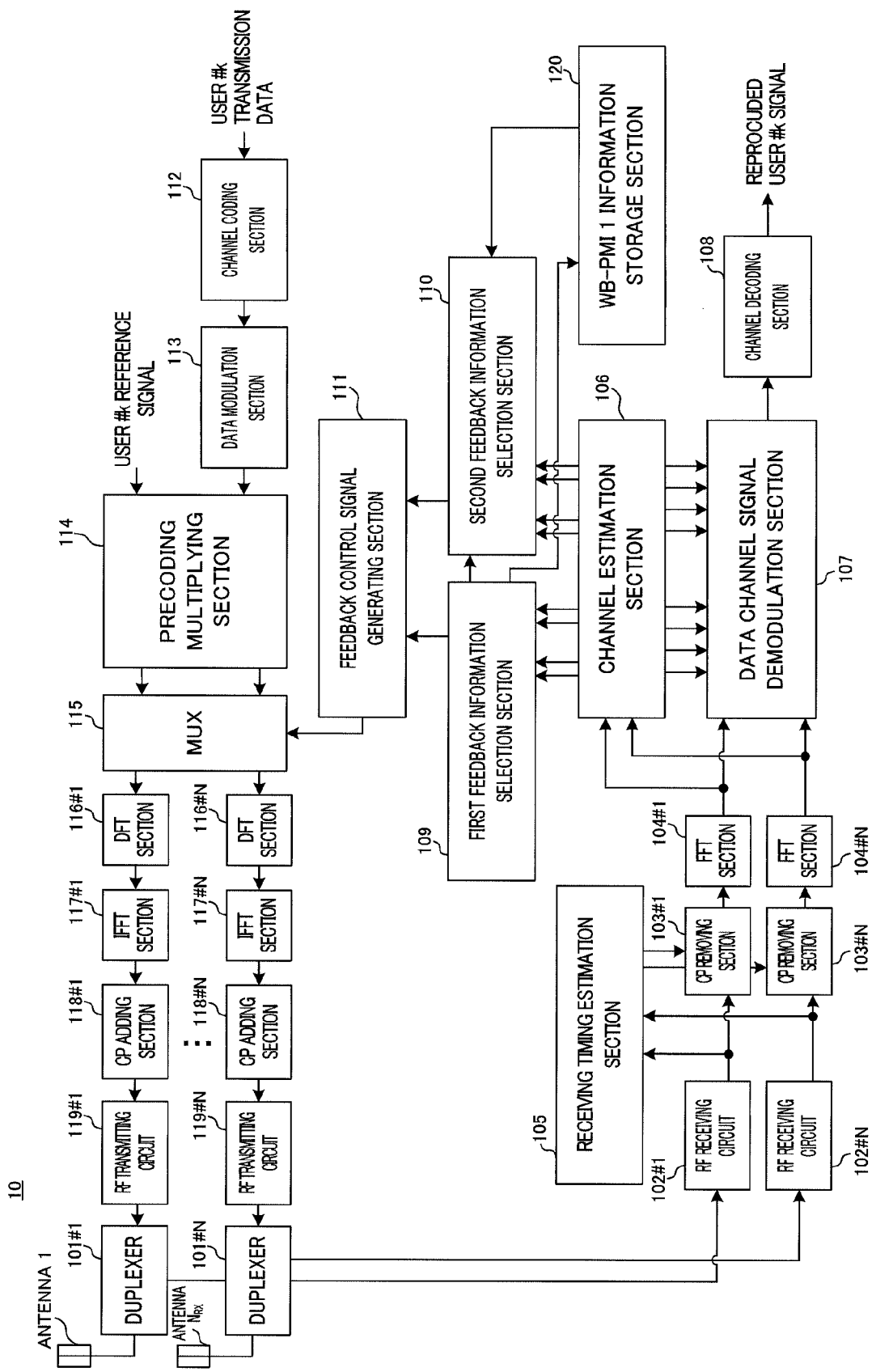
FIG. 7 is a block diagram showing a configuration of a mobile terminal apparatus according to embodiment 1 of the present invention.
Figure 8:
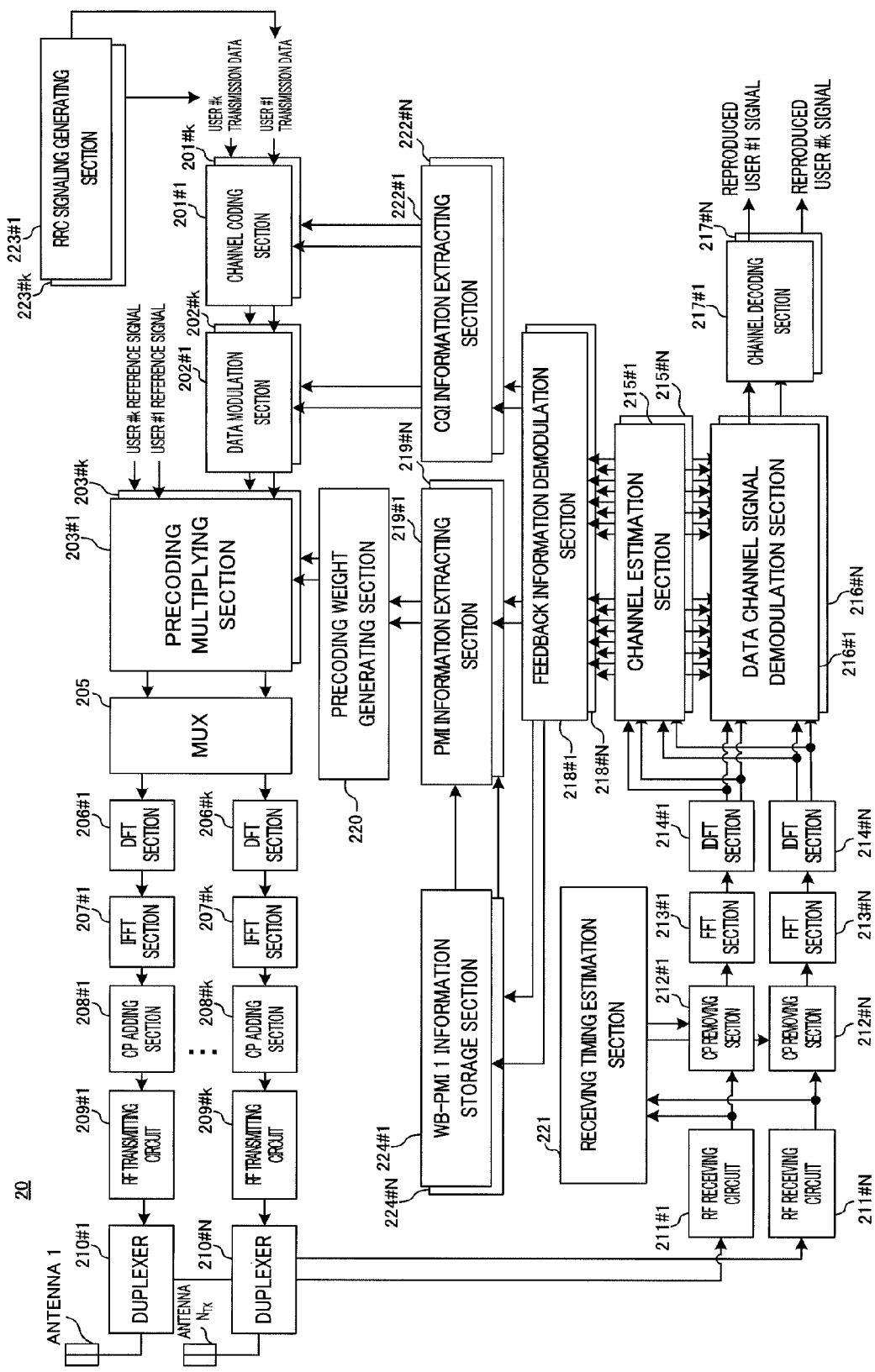
FIG. 8 is a block diagram showing a configuration of a base station apparatus according to embodiment 1.

FIG. 7 is a block diagram showing a configuration of a mobile terminal apparatus 10 according to an embodiment of the present invention. FIG. 8 is a block diagram showing a configuration of a base station apparatus 20 according to the present embodiment. Note that the configurations of the base station apparatus 20 and the mobile terminal apparatus 10 illustrated in FIG. 7 and FIG. 8 are given by simplifying the present invention for ease of explanation, and both have configurations which a general base station apparatus and mobile terminal apparatus have.

In the mobile terminal apparatus 10 shown in FIG. 7, transmission signals transmitted from the base station apparatus 20 are received by antennas 1 to $N_{RX}$, electrically separated into the transmission route and the reception route by duplexers 101 #1 to 101 #N, and then output to RF receiving circuits 102 #1 to 102 #N. Then, in RF receiving circuit 102 #1 to 102 #N, a frequency conversion process to convert the radio frequency signals to baseband signals is performed, and the results are output to a receiving timing estimation section 105 and CP removing sections 103 #1 to 103 #N. The receiving timing estimation section 105 estimates the receiving timing from the received signals after the frequency conversion process, and outputs the receiving timing to CP removing sections 103 #1 to 103 #N. CP removing sections 103 #1 to 103 #N remove the CPs (Cyclic Prefixes), and fast Fourier transform sections (FFT sections) 104 #1 to 104 #N perform a Fourier transform to convert the time sequence signal into frequency domain signals. The received signals having been converted into frequency domain signals are output to a channel estimation section 106 and a data channel signal demodulation section 107.

The channel estimation section 106 estimates the channel state from the reference signal included in the received signals output from FFT sections 104 #1 to #N, and reports the estimated channel state to a data channel signal demodulation section 107, a first feedback information selection section 109 and a second feedback information selection section 110. The data channel signal demodulation section 107 demodulates the data channel signal based on the reported channel state. The demodulated data channel signal is subjected to channel decoding in a channel decoding section 108 and reproduced back to a user #k signal.

The first feedback information selection section 109 selects PMIs based on the channel state reported from the channel estimation section 106. Here, the first feedback information selection section 109 selects PMI from two codebooks—that is, the first codebook for a wideband/long cycle and a second codebook for a subband/short cycle. The first feedback information selection section 109 selects WB-PMI 1 from the first codebook, and also selects WB-PMI 2 from the second codebook. In this case, the first feedback information selection section 109 is able to select WB-PMI 1 and WB-PMI 2 for SU-MIMO transmission and for MU-MIMO transmission. Note that this first feedback information selection section 109 constitutes a feedback information selection SECTION.

Also, the first feedback information selection section 109 selects an RI based on the channel state reported from the channel estimation section 106. For example, when feedback method according to the above-described first example is adopted, the RI is selected in accordance with the value of the PTI. That is to say, when the value of the PTI is changed from 0 to 1, the same RI as the last RI that was fed back is selected. Furthermore, the first feedback information selection section 109 measures wideband channel quality based on the channel state reported from the channel estimation section 106, and selects CQIs (WB-CQIs) corresponding to WB-PMI 1 and WB-PMI 2. In this case, the first feedback information selection section 109 is able to select WB-CQIs for SU-MIMO transmission and for MU-MIMO transmission.

Furthermore, the first feedback information selection section 109 selects a PTI based on the selected RI and WB-PMI 1. For example, the PTI is selected in accordance with the state of change from the previously selected RI and WB-PMI 1. For example, when the feedback method according to the above-described second example is adopted, the PTI is selected in accordance with the value of the RI. That is to say, when a different RI from the last RI that was fed back is selected, 0 is selected for the value of the PTI. Note that, when 0 is selected for the value of the PTI, the first feedback information selection section 109 outputs the selected RI and WB-PMI 1 to a WB-PMI 1 information storage section 120, which will be described later. As described above, the RI, WB-PMI 1, WB-PMI 2, PTI and WB-CQIs selected in the first feedback information selection section 109 are reported to a feedback control signal generating section 111. Also, the RI, WB-PMI 1 and PTI that are selected in the first feedback information selection section 109 are reported to a second feedback information selection section 110.

The second feedback information selection section 110 selects PMIs based on the channel state reported from the channel estimation section 106. The second feedback information selection section 110 selects SB-PMI 2 from the second codebook. The second feedback information selection section 110 selects, per subband, SB-PMI 2 that maximizes the received SINR, based on the RI and WB-PMI 1 reported from the first feedback information selection section 109. In this case, the second feedback information selection section 110 is able to select SB-PMIs 2 for SU-MIMO transmission and for MU-MIMO transmission.

Also, the second feedback information selection section 110 measures subband channel quality based on the channel state reported from the channel estimation section 106, and selects CQIs (SB-CQIs) corresponding to SB-PMI 2. In this case, the second feedback information selection section 110 is able to select SB-CQIs for SU-MIMO transmission and for MU-MIMO transmission.

Furthermore, when the value of the PTI reported from the first feedback information selection section 109 is 1, the second feedback information selection section 110 selects SB-PMI 2 and SB-CQIs based on the RI and WB-PMI 1 stored in the WB-PMI 1 information storage section 120. In this way, SB-PMI 2 and SB-CQIs selected in the second feedback information selection section 110 are reported to the feedback control signal generating section 111.

The WB-PMI 1 information storage section 120 stores the RI and WB-PMI 1 input from the first feedback information selection section 109. In the WB-PMI 1 information storage section 120, every time an RI and WB-PMI 1 are input from the first feedback information selection section 109, the values of the RI and WB-PMI 1 are updated, thus constantly providing a state where the latest RI and WB-PMI 1 are stored.

Based on the reported RI, PMIs (WB-PMI 1, WB-PMI 2 and SB-PMI 2) and CQIs (WB-CQIs and SB-CQIs), the feedback control signal generating section 111 generates a control signal (for example, a PUCCH signal) to feed back to the base station apparatus 20. In this case, the feedback control signal generating section 111 generates a control signal in accordance with the formats of report 1 to report 3, depending on the value of the PTI reported from the first feedback information selection section 109. Also, the feedback control signal generating section 111 performs channel coding/data modulation of information about WB-PMI 1, WB-PMI 2, SB-PMI 2, WB-CQIs, SB-CQIs and RI to feed back in the PUCCH. The control signal generated in the feedback control signal generating section 111 and the PMIs, CQIs and RI after the channel coding are output to the multiplexer (MUX: multiplexing section) 115.

On the other hand, transmission data #k related to user #k that is output from an upper layer is subjected to channel coding by the channel coding section 112, and, after that, demodulated by the data modulation section 113. Transmission data #k having been subjected to data modulation in the data modulation section 113 is then subjected to an inverse Fourier transform in a discrete Fourier transform section, which is not illustrated, converted from a time sequence signal to a frequency domain signal, and output to a subcarrier mapping section, which is not illustrated.

The subcarrier mapping section maps transmission data #k to subcarriers in accordance with schedule information that is designated from the base station apparatus 20. Here, the subcarrier mapping section 112 maps (multiplexes) reference signal #k that is generated by a reference signal generating section, which is not illustrated, to subcarriers, with transmission data #k. Transmission data #k mapped to subcarriers in this way is output to a precoding multiplying section 114.

The precoding multiplying section 114 shifts the phase and/or amplitude of transmission data #k, for each of the receiving antennas 1 to $N_{RX}$, based on the precoding weights corresponding to the PMIs. Transmission data #k having been subjected to the phase and/or amplitude shift in the precoding multiplying section 114 is output to a multiplexer (MUX) 115, which constitutes a multiplexing means.

The multiplexer (MUX) 115 combines transmission data #k having been subjected to the phase and/or amplitude shift and the control signal having been generated in the feedback control signal generating section 111, and generates a transmission signal for each of the receiving antennas 1 to $N_{RX}$. The mapping (multiplexing) in this multiplexer (MUX) 115 is performed in accordance with the above-described first to fourth examples. That is to say, feedback information to correspond to report 1 to report 3 is multiplexed on different subframes depending on the values of the PTIs.

The transmission signals generated in the multiplexer (MUX) 115 are subjected to a discrete Fourier transform in discrete Fourier transform sections (DFT sections) 116 #1 to 116 #N and converted from time sequence signals to frequency domain signals. After that, an inverse fast Fourier transform is performed in inverse fast Fourier transform sections (IFFT sections) 117 #1 to 117 #N, and, after the frequency domain signals are converted to time domain signals, CPs are added in CP adding sections 118 #1 to 118 #N, and the results are output to RF transmitting circuit 119 #1 to 119 #N.

In RF transmitting circuit 119 #1 to 119 #N, a frequency conversion process for conversion into a radio frequency band is performed, and, after that, the results are output to the antenna 1 to the antenna $N_{RX}$, via duplexers 101 #1 to 101 #N, and output to the radio base station apparatus 20 from the antenna 1 to the antenna $N_{RX}$ on the uplink. Note that these RF transmitting circuits 119 #1 to 119 #N, duplexers 101 #1 to 101 #N and antenna 1 to antenna $N_{RX}$ constitute a transmitting section to transmit control signals.

Meanwhile, in the base station apparatus 20 shown in FIG. 8, transmission data #1 to #k to correspond to users #1 to #k are output to channel coding sections 201 #1 to 201 #k. RRC signaling generating sections 223 #1 to 223 #k corresponding to users #1 to #k generate RRC signaling including information such as the MIMO transmission method (transmission mode), the CSI (Channel State Information) feedback mode in the PUCCH/PUSCH, and the feedback cycle and offset parameters in that feedback mode.

Transmission data #1 to #k are subjected to channel coding in channel coding sections 201 #1 to 201 #k, and, after that, output to data modulation sections 202 #1 to 202 #k and subjected to data modulation. Transmission data #1 to #k subjected to data modulation in data modulation sections 202 #1 to 202 #k are subjected to an inverse discrete Fourier transform in a discrete Fourier transform section, which is not illustrated, converted from time sequence signals to frequency domain signals and then output to precoding multiplying sections 203 #1 to 203 #k.

Precoding multiplying sections 203 #1 to 203 #k apply a phase and/or amplitude shift to transmission data #1 to #k, for each of the antennas 1 to $N_{TX}$, based on precoding weights provided from a precoding weight generating section 220, which will be described later (weighting of the antennas 1 to $N_{TX}$ by precoding). Transmission data #1 to #k having been subjected to the phase and/or amplitude shift by precoding multiplying sections 203 #1 to 203 #k are output to a multiplexer (MUX) 205.

The multiplexer (MUX) 205 generates a transmission signal for each of the transmitting antennas 1 to $N_{TX}$, with respect to transmission data #1 to #k having been subjected to the phase and/or amplitude shift. The transmission signals generated by the multiplexer (MUX) 205 are subjected to a discrete Fourier transform in discrete Fourier transform sections (DFT sections) 206 #1 to 206 #k, and converted from time sequence signals to frequency domain signals. After that, an inverse fast Fourier transform is performed in inverse fast Fourier transform sections (IFFT sections) 207 #1 to 207 #k, and, after frequency domain signals are converted to time domain signals, CPs are added in CP adding sections 208 #1 to 208 #k, and the results are output to RF transmitting circuits 209 #1 to 209 #k.

After a frequency conversion process for conversion into a radio frequency band is performed in RF transmitting circuit 209 #1 to 209 #N, the results are output to the antenna 1 to antenna $N_{TX}$ via duplexers 210 #1 to 210 #N, and output from the antenna 1 to antenna $N_{TX}$, to the mobile terminal apparatus 10, on the downlink.

Transmission signals that are output from the mobile terminal apparatus 10 on the uplink are received by antennas 1 to $N_{TX}$, electrically separated into the transmission route and the reception route in duplexers 210 #1 to 210 #N, and, after that, output to RF receiving circuits 211 #1 to 211 #N. Then, after a frequency conversion process for conversion from radio frequency signals to baseband signals is performed in RF receiving circuits 211 #1 to 211 #N, the results are output to a receiving timing estimation section 221 and CP removing sections 212 #1 to 212 #N. In the receiving timing estimation section 221, the receiving timing is estimated from the received signals after having been subjected to the frequency conversion process, and the receiving timing is output to CP removing sections 212 #1 to 212 #N.

The CPs are removed in CP removing sections 212 #1 to 212 #N, and, in fast Fourier transform sections (FFT sections) 213 #1 to 213 #N, a Fourier transform is performed, and the time sequence signals are converted to frequency domain signals. After that, an inverse discrete Fourier transform is performed in inverse discrete Fourier transform sections (IDFT sections) 214 #1 to 214 #N, and the frequency domain signals are converted to time domain signals. The received signals having been converted to time domain signals are output to channel estimation sections 215 #1 to 215 #N and data channel signal demodulation sections 216 #1 to 216 #N.

Channel estimation sections 215 #1 to 215 #N estimate the channel state from the reference signal included in the received signals output from IDFT sections 214 #1 to 214 #N, and report the estimated channel state to data channel signal demodulation sections 216 #1 to 216 #N. Data channel signal demodulation sections 216 #1 to 216 #N demodulate the data channel signals based on the reported channel state. The demodulated data channel signals are subjected to channel decoding in channel decoding sections 217 #1 to 217 #N, and reproduced back to user #1 to #k signals. Note that the antennas 1 to $N_{TX}$, duplexers 210 #1 to 210 #N and RF receiving circuits 211 #1 to 211 #N constitute a receiving means to receive control signals.

Feedback information demodulation sections 218 #1 to 218 #N demodulate information related to the channels (channel information), including, for example, feedback information such as the CQIs, PMIs, RI and PTI reported by the PUCCH, from information included in each control channel signal (for example, the PUCCH). The information demodulated in feedback information demodulation sections 218 #1 to 218 #N is output to PMI information extracting sections 219 #1 to 219 #N and CQI information extracting sections 222 #1 to 222 #N. In particular, feedback information demodulation sections 218 #1 to 218 #N demodulate WB-PMI 1 that is reported by the PUCCH, and output that WB-PMI 1 to WB-PMI 1 information storage sections 224 #1 to 224 #N, which will be described later.

WB-PMI 1 information storage sections 224 #1 to 224 #N store WB-PMI 1 that is input from feedback information demodulation sections 218 #1 to 218 #N. In WB-PMI 1 information storage sections 224 #1 to 224 #N, every time WB-PMI 1 is input from feedback information demodulation sections 218 #1 to 218 #N, the value of WB-PMI 1 is updated, thus constantly providing a state where the latest WB-PMI 1 is stored. Note that WB-PMI 1 information storage sections 224 #1 to 224 #N constitute a storage section.

Note that, when the feedback method according to the above-described third example is adopted, WB-PMI 1 information storage sections 224 #1 to 224 #N store in advance virtual PMIs to be used as WB-PMI 1 in accordance with the RI. In this case, for example, as virtual PMIs, PMIs that assume WB-PMI 1 to be 0 when the rank which the RI after the change indicates is rank 1 or rank 2, assume WB-PMI 1 to be 1 when the rank information which the RI after the change indicates is rank 3 or rank 4, and assume WB-PMI 1 to be 2 when the rank information which the RI after the change indicates is rank 5 to rank 8.

Also, when the feedback method according to the above-described fourth example is adopted, in WB-PMI 1 information storage sections 224 #1 to 224 #N, virtual PMI to be used as WB-PMI 1 are stored in advance, according to the combination of the last RI and WB-PMI 1 that were fed back and the RI after the change. In this case, for example, it is possible to store, for example, PMIs that assume WB-PMI 1 to be 0 when the RI after the change is rank 1 to rank 8, the last RI that was fed back is rank 1 to rank 8 and the last WB-PMI 1 that was fed back is 0, assume WB-PMI 1 to be 1 when the RI after the change is rank 1 to rank 4, the last RI that was fed back is rank 1 or rank 2, and the last WB-PMI 1 that was fed back is 1. Likewise, it is possible to store PMIs that assume WB-PMI 1 to be 2 when the RI after the change is rank 1 to rank 4, the last RI that was fed back is rank 3 or rank 4, and the last WB-PMI 1 that was fed back is 1, and assume WB-PMI 1 to be 4 when the RI after the change is rank 1 to rank 4, the last RI that was fed back is rank 5 to rank 8, and the last WB-PMI 1 that was fed back is 1. Also, it is equally possible to store PMIs that assume WB-PMI 1 to be 0 when the RI after the change is rank 5 to rank 8, the last RI that was fed back is rank 1 or rank 2, and the last WB-PMI 1 that was fed back is 1, assume WB-PMI 1 to be 1 when the RI after the change is rank 5 to rank 8, the last RI that was fed back is rank 3 or rank 4, and the last WB-PMI 1 that was fed back is 1, and assume WB-PMI 1 to be 2 when the RI after the change is rank 5 to rank 8, the last RI that was fed back is rank 5 to rank 8, and the last WB-PMI 1 that was fed back is 1.

PMI information extracting sections 219 #1 to 219 #N extract PMI information from the information demodulated by feedback information demodulation section 218 #1 to 218 #N. In this case, PMI information extracting sections 219 #1 to 219 #N extract the PMI information designated in report 2 and report 3 included in the PUCCH, based on the last RI and PTI that were fed back. Here, the PMI information refers to WB-PMI 1 selected from the first codebook and WB-PMI 2 and SB-PMI 2 selected from the second codebook W2. In particular, PMI information extracting sections 219 #1 to 219 #N extract WB-PMI 1 stored in WB-PMI 1 information storage sections 224 #1 to 224 #N as PMI information, when the value of the PTI reported from feedback information demodulation section 218 #1 to 218 #N is 1. The extracted WB-PMI 1, WB-PMI 2 and SB-PMI 2 are output to the precoding weight generating section 220.

Note that, when the feedback method according to the above-described third example is adopted, when PMI information extracting sections 219 #1 to 219 #N detect that a different RI from the last RI that was fed back is selected and 1 is selected for the value of the PTI, based on information from feedback information demodulation sections 218 #1 to 218 #N, PMI information extracting sections 219 #1 to 219 #N acquire a virtual PMI corresponding to the RI after the change, from WB-PMI 1 information storage sections 224 #1 to 224 #N, as WB-PMI 1. The virtual PMI acquired in this way is output to the precoding weight generating section 220.

Likewise, when the feedback method according to the above-described fourth example is adopted, when PMI information extracting sections 219 #1 to 219 #N detect that a different RI from the last RI that was fed back is selected and 1 is selected for the value of the PTI based on information from feedback information demodulation sections 218 #1 to 218 #N, PMI information extracting sections 219 #1 to 219 #N extract a virtual PMI to match the combination of the last RI and WB-PMI 1 that were fed back and the RI after the change, from WB-PMI 1 information storage sections 224 #1 to 224 #N, as WB-PMI 1. The virtual PMI extracted in this way is output to the precoding weight generating section 220.

Note that, in these cases, PMI information extracting sections 219 #1 to 219 #N constitute an acquisition means to acquire virtual PMIs from the storage means.

CQI information extracting sections 222 #1 to 222 #N extract CQI information from the information demodulated in feedback information demodulation sections 218 #1 to 218 #N. Here, the CQI information refers to WB-CQIs and SB-CQIs. The extracted WB-CQI and SB-CQI are output to channel coding sections 201 #1 to 201 #k and data modulation section 202 #1 to 202 #k, and used to select MCS for transmission data #1 to transmission data #k.

The precoding weight generating section 220 generates precoding weights that indicate the amounts of phase and/or amplitude shift for transmission data #1 to #k, based on WB-PMI 1, WB-PMI 2 and SB-PMI 2 that are output from PMI information extracting sections 219 #1 to 219 #N, and the RI. The generated precoding weights are output to precoding multiplying sections 203 #1 to 203 #k, and used in the precoding of transmission data #1 to transmission data #k. Note that the precoding weight generating section 220 constitutes a weight generating means.

When the feedback method according to the first example is adopted in a mobile communication system 1 having this configuration, when the value of the PTI is changed from 0 to 1, the first feedback information selection section 109 selects the same RI as the last RI that was fed back, and the multiplexer 115 multiplexes that RI and PTI after the change on a subframe, so that it is possible to prevent the value of the PTI and the rank indicated by the RI from changing at the same time, thus preventing the situation where WB-PMI 1 is missing, and making it possible to generate precoding weights reliably, in the base station apparatus eNodeB, even in downlink MIMO transmission using eight transmitting antennas.

In particular, in the base station apparatus 20, when the value of the PTI reported from feedback information demodulation sections 218 #1 to 218 #N is 1, PMI information extracting sections 219 #1 to 219 #N extract WB-PMI 1 (the last WB-PMI 1 that was fed back when the value of the PTI was 0) stored in WB-PMI 1 information storage sections 224 #1 to 224 #N, as PMI information, which is then used to generate precoding weights. By this means, it is possible to generate precoding weights based on WB-PMI 1 that reflects a channel state which resembles the current wideband channel state the most.

Also, in the mobile communication system 1, when the feedback method according to the second example is adopted, when a different RI from the last RI that was fed back is selected, the first feedback information selection section 109 selects 0 for the value of the PTI, and the multiplexer 115 multiplexes that PTI and the RI after the change on a subframe, so that it is possible to prevent the value of the PTI and the rank indicated by the RI from changing at the same time, thus preventing the situation where WB-PMI 1 is missing, and making it possible to generate precoding weights reliably, in the base station apparatus eNodeB, even in downlink MIMO transmission using eight transmitting antennas.

Furthermore, in the mobile communication system 1, the feedback method according to the third example is adopted, the mobile terminal apparatus 10 selects a different RI from the last RI that was fed back and selects 1 for the value of the PTI, PMI information extracting sections 219 #1 to 219 #N extract a virtual PMI that corresponds to the RI after the change, as WB-PMI 1, from WB-PMI 1 information storage sections 224 #1 to 224 #N, which is then used to generate precoding weights, so that it is possible to prevent the situation where WB-PMI 1 to match the RI after the change is missing, and, consequently, it is possible to generate precoding weights reliably, in the base station apparatus eNodeB, even in downlink MIMO transmission using eight transmitting antennas.

Furthermore, in the mobile communication system 1, when the feedback method according to the fourth example is adopted, when the mobile terminal apparatus 10 selects a different RI from the last RI that was fed back and selects 1 for the value of the PTI, PMI information extracting sections 219 #1 to 219 #N acquire a virtual PMI to match the combination of the last RI and WB-PMI 1 that were fed back and the RI after the change, as WB-PMI 1, from WB-PMI 1 information storage sections 224 #1 to 224 #N, which is then used to generate precoding weights, so that it is possible to prevent the situation where WB-PMI 1 to match the RI after the change is missing, and, consequently, it is possible to generate precoding weights reliably, in the base station apparatus eNodeB, even in downlink MIMO transmission using eight transmitting antennas.

Embodiment 2

In feedback mode 2-1 in downlink MIMO transmission using eight transmitting antennas, as shown in FIG. 5A, feedback information related to a wideband (WB-CQIs (CW 1 and CW 2) and WB-PMI 2) is transmitted in an overlapping manner when PTI=0. The same feedback information that relates to a wideband and that is transmitted in an overlapping manner when PTI=0 in this way might prevent effective use of radio resources. In the mobile communication system 1 according to embodiment 2, by avoiding overlapping transmission of the same feedback information related to a wideband, in downlink MIMO transmission using eight transmitting antennas, it is possible to secure improvement of throughput performance and feed back PMIs that are required to generate precoding weights.

That is to say, in the mobile communication system 1 according to embodiment 2, in a mode to include a PTI in the PUCCH and feed back the PTI to the base station apparatus 20 for downlink MIMO transmission using a plurality of transmitting antennas (for example, eight transmitting antennas), improvement of throughput performance is secured and the PMIs to be required to generate precoding weights are fed back, in downlink MIMO transmission using eight transmitting antennas, by multiplexing feedback information related to a subband on part of feedback information corresponding to report 3 when PTI=0 and transmitting the multiplex signal to the base station apparatus 20 through the PUCCH.

FIG. 9 is a diagram to explain feedback method using PUCCH in mobile communication system 1 according to embodiment 2 of the present invention. FIG. 9A shows the feedback information when PTI=0, and FIG. 9B shows the feedback information when PTI=1. Note that FIG. 9 shows a case where the number of subbands (BPs) is two. Also, in FIG. 9, for ease of explanation, a subframe where the RI is allocated is referred to as the first subframe.

As shown in FIG. 9A, with the feedback method according to embodiment 2, as feedback information to correspond to report 3, feedback information related to a wideband is multiplexed, and also feedback information related to a subband is multiplexed, To be more specific, WB-CQIs (CW 1 and CW 2) and WB-PMI 2 are multiplexed on the fourth subframe, and SB-CQIs (CW 1 and CW 2), SB indices and SB-PMI 2 are multiplexed on the sixth and eighth subframes. A case is shown here where SB-CQIs 1 (CW 1 and CW 2), SB index 1, and SB-PMI 2 are multiplexed on the sixth subframe, and SB-CQIs 2 (CW 1 and CW 2), SB index 2 and SB-PMI 2 are multiplexed on the eighth subframe.

In the feedback method according to embodiment 2, feedback information related to a subband is multiplexed on part of feedback information corresponding to report 3, so that, even when PTI=0, it is possible to feed back SB-PMI 2 to be required when selecting the precoding weight that maximizes the received SINR, to the base station apparatus 20, and, consequently, it is possible to generate precoding weights which can improve throughput performance in the base station apparatus 20 and secure improvement of throughput performance.

In particular, in the feedback method according to embodiment 2, it is preferable to multiplex feedback information for SU-MIMO when PTI=0 (or PTI=1), and multiplex feedback information for MU-MIMO when PTI=1 (or PTI=0). In this case, it is possible to switch between the feedback information for SU-MIMO and the feedback information for MU-MIMO depending on the value of the PTI, so that it is possible to adequately switch between SU-MIMO transmission and MU-MIMO transmission in the base station apparatus eNodeB, and secure improvement of throughput performance in a flexible fashion.

The mobile communication system 1 according to embodiment 2 is realized by a mobile terminal apparatus 10 and a base station apparatus 20 having common configurations as in the mobile communication system 1 according to embodiment 1. However, when feedback information for SU-MIMO and feedback information for MU-MIMO are switched and multiplexed depending on the value of the PTI, the functions of the first feedback information selection section 109 and the multiplexer 115 of the mobile terminal apparatus 10 and RRC signaling generating section 223 #1 to 223 #k of the base station apparatus 20 are added.

The first feedback information selection section 109 according to embodiment 2 selects the PTI according to the content (for example, the value of the PTI) reported from the base station apparatus 20 by RRC signaling, or according to the content reported from the base station apparatus 20 by the PDCCH. As described above, by selecting the PTI according to the content reported from the base station apparatus 20, it is possible to select the value of the PTI to match the MIMO transmission scheme selected in the base station apparatus 20. In particular, when the value of the PTI is selected according to the content reported by the PDCCH, it is possible to switch the value of the PTI on a dynamic basis, and follow the switching of the SU-MIMO transmission scheme in a flexible fashion.

Also, it is also possible, in the first feedback information selection section 109, switch the value of the PTI on a periodic basis, according to the cycle reported in advance from the base station apparatus 20 by RRC signaling and the PDCCH. In this case, it is preferable to set the cycle to select 0 for the value of the PTI in a certain cycle (for example, 20 ms). Information (information such as SB-PMI 2) when 1 is selected for the value of the PTI relies on the last (most recent) WB-PMI 1 that was fed back (that is to say, WB-PMI 1 when 0 was selected for the value of the PTI for the last time). Consequently, 1 keeps being selected for the value of the PTI, and, if WB-PMI 1 is not fed back over a long period of time, the situation might occur where the accuracy of information such as SB-PMI 2 is degraded and therefore the error propagation rate increases. As described above, by selecting 0 for the value of the PTI in a certain cycle, it is possible to suppress the influence of error propagation when 1 keeps being selected continuously for the value of the PTI.

Furthermore, in the first feedback information selection section 109, the mobile terminal apparatus 10 performs blind detection of the MIMO transmission scheme (SU-MIMO transmission or MU-MIMO transmission) from the base station apparatus 20, and select the value of the PTI to match the detection result. In this case, the value of the PTI is selected according to the blind detection result in the mobile terminal apparatus 10, so that it is possible to select the value of the PTI to match the MIMO transmission scheme selected in the base station apparatus 20, without requiring special signaling from the base station apparatus 20.

Furthermore, in the first feedback information selection section 109, it is equally possible to select the value of the PTI according to a predetermined threshold. For example, compared to the case of using the present optimal RI and WB-PMI 1, it is possible to switch the value of the PTI when the loss of the transmission rate using the last RI and WB-PMI 1 that were fed back exceeds 5%. In this case, too, the value of the PTI is selected according to the calculation result in the mobile terminal apparatus 10, so that it is possible to select the value of the PTI to match the MIMO transmission scheme selected in the base station apparatus 20, without requiring special signaling from the base station apparatus 20.

Furthermore, in the first feedback information selection section 109, it is equally possible to select the value of the PTI depending on the rank which the RI indicates. For example, when the rank is comparatively high, SU-MIMO transmission is predominant and MU-MIMO transmission is less likely to be selected, so that PTI=0 is fed back more frequently. On the other hand, when the rank is low, MU-MIMO transmission is likely to be selected, so that it is possible to feed back PTI=1 more frequently. In this case, too, given that the value of the PTI is selected according to the calculation result in the mobile terminal apparatus 10, it is possible to select the value of the PTI to match the MIMO transmission scheme selected in the base station apparatus 20, without requiring special signaling from the base station apparatus 20. Note that, in this case, it is equally possible to define the cycle on which the rank relies, and switch the value of the PTI on a periodic basis in accordance with that cycle.

In the multiplexer 115 according to embodiment 2, feedback information for SU-MIMO and feedback information for MU-MIMO are switched and multiplexed on feedback information to correspond to report 3, depending on the selection result of the value of the PTI in the first feedback information selection section 109. For example, feedback information for SU-MIMO is multiplexed on feedback information to correspond to report 3 when PTI=0, and feedback information for MU-MIMO is multiplexed on feedback information to correspond to report 3 when PTI=1.

RRC signaling generating sections 223 #1 to 223 #k according to embodiment 2 generate RRC signaling, which includes the value of the PTI and the cycle associated with that value, depending on the configuration of the above-described first feedback information selection section 10. That is to say, transmission data #1 to #k from the base station apparatus 20 include RRC signaling, which includes information such as the value of the PTI and the cycle associated with that value.

In a mobile communication system 1 having this configuration, when the first feedback information selection section 109 selects 0 for the value of the PTI, the multiplexer 115 multiplexes feedback information related to a subband on part of feedback information corresponding to report 3, so that, even when the value of the PTI is 0, it is possible to feed back SB-PMI 2 to be required when selecting the precoding weight that maximize the received SINR, to the base station apparatus 20, and, consequently, it is possible to generate precoding weights which can improve throughput performance in the base station apparatus 20 and secure improvement of throughput performance.

In particular, in the mobile communication system 1 according to embodiment 2, when the first feedback information selection section 109 selects 0 for the value of the PTI, the multiplexer 115 multiplexes feedback information for SU-MIMO on report 3, and, when the first feedback information selection section 109 selects 1 for the value of the PTI, the multiplexer 115 multiplexes feedback information for MU-MIMO on report 3, so that it is possible to switch between the feedback information for SU-MIMO and the feedback information for MU-MIMO depending on the value of the PTI, and, consequently, in the base station apparatus 20, it is possible to switch between SU-MIMO transmission and MU-MIMO transmission adequately, and secure improvement of throughput performance in a flexible fashion.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

For example, although cases have been described in the above descriptions where the base station apparatus 20 has eight transmitting antennas, in an example to include and feed back a PTI in a physical uplink control channel (PUCCH), the present invention is by no means limited to this, regarding the configuration of the base station apparatus 20 to which the present invention is applied. For example, cases where the base station apparatus 20 has two transmitting antennas or four transmitting antennas are equally applicable.

The disclosure of Japanese Patent Application No. 2010-225013, filed on Oct. 4, 2010, including the specification, drawings and abstract, is incorporated herein by reference in its entirety.

The invention claimed is:

1. A feedback method of including a PTI (Precoder Type Indicator) in a physical uplink control channel and feeding back the PTI to a radio base station apparatus for downlink MIMO (Multiple-Input and Multiple-Output) transmission using a plurality of transmitting antennas, the feedback method comprising the steps of:
    selecting a same RI (Rank Indicator) as a last RI that was fed back, when the value of the PTI on a subframe is changed from 0 to 1;
    multiplexing the RI and the PTI after the change to generate a multiplex signal; and
    transmitting the multiplex signal to the radio base station apparatus by the physical uplink control channel.

2. The feedback method according to claim 1, wherein, in the radio base station apparatus, a last wideband first PMI (Precoding Matrix indicator) that was fed back when the value of the PTI was 0, is used to generate a precoding weight.

3. The feedback method according to claim 1, wherein, in a mobile terminal apparatus, feedback information related to a subband is multiplexed on part of feedback information related to a wideband, when the value of the PTI is 0, and the multiplex signal is transmitted to the radio base station apparatus by the physical uplink control channel.

4. The feedback method according to claim 3, wherein, in the mobile terminal apparatus, feedback information to multiplex on the subframe is switched between feedback information for SU (Single User)-MIMO transmission and feedback information for MU (Multiple User)-MIMO transmission, depending on the value of the PTI.

5. The feedback method according to claim 4, wherein the value of the PTI is reported from the radio base station apparatus, and, in the mobile terminal apparatus, the value of the PTI is selected depending on the reported value of the PTI.

6. The feedback method according to claim 4, wherein, in the mobile terminal apparatus, a blind detection of a MIMO transmission scheme selected in the radio base station apparatus is performed, and the value of the PTI to match a detection result of the blind detection is selected.

7. The feedback method according to claim 4, wherein a cycle to switch the value of the PTI is reported from the radio base station apparatus, and, in the mobile terminal apparatus, the value of the PTI is switched on a periodic basis, in accordance with the cycle.

8. The feedback method according to claim 7, wherein a cycle to make the value of the PTI 0 is reported from the radio base station apparatus, and, in the mobile terminal apparatus in a certain cycle, the value of the PTI is made 0 in accordance with the cycle.

9. A mobile terminal apparatus comprising:
    a feedback information selection section that, in a mode to include a PTI (Precoder Type Indicator) in a physical uplink control channel and feed back the PTI to a radio base station apparatus for downlink MIMO (Multiple-Input and Multiple-Output) transmission using a plurality of transmitting antennas, selects a same RI (Rank Indicator) as a last RI that was fed back, when the value of the PTI on a subframe is changed from 0 to 1;
    a multiplexing section that multiplexes the RI and the PTI after the change to generate a multiplex signal; and
    a transmission section that transmits the multiplex signal to the radio base station apparatus by the physical uplink control channel.

10. A feedback method of including a PTI (Precoder Type Indicator) in a physical uplink control channel and feeding back the PTI to a radio base station apparatus for downlink MIMO (Multiple-Input and Multiple-Output) transmission using a plurality of transmitting antennas, the feedback method comprising the steps of:
    selecting 0 for the value of the PTI on a subframe when a different RI (Rank Indicator) from a last RI that was fed back is selected;
    multiplexing the PTI and the RI after the different RI from the last RI is selected to generate a multiplex signal; and
    transmitting the multiplex signal to the radio base station apparatus by the physical uplink control channel.

11. A feedback method of including a PTI (Precoder Type Indicator) in a physical uplink control channel and feeding back the PTI to a radio base station apparatus for downlink MIMO (Multiple-Input and Multiple-Output) transmission using a plurality of transmitting antennas, the feedback method comprising the steps of:
    in a radio base station apparatus, storing in advance a virtual PMI (Precoding Matrix Indicator) to be used as a wideband first PMI, depending on an RI (Rank Indicator);
    in a mobile terminal apparatus, selecting a different RI from a last RI that was fed back when 1 is selected for the value of the PTI on a subframe, and multiplexing the PTI and the different RI from the last RI to generate a multiplex signal;
    transmitting the multiplex signal to the radio base station apparatus by the physical uplink control channel; and in the radio base station apparatus, using the virtual PMI to match the different RI from the last RI is fed back to generate a precoding weight.

12. A feedback method of including a PTI (Precoder Type Indicator) in a physical uplink control channel and feeding back the PTI to a radio base station apparatus for downlink MIMO (Multiple-Input and Multiple-Output) transmission using a plurality of transmitting antennas, the feedback method comprising the steps of:

in a radio base station apparatus, storing in advance a virtual PMI (Precoding Matrix Indicator) to be used as a wideband first PMI, depending on a combination of a last RI (Rank Indicator) and wideband first PMI that were fed back and a different RI from the last RI;

in a mobile terminal apparatus, when the different RI from the last RI that was fed back is selected and 1 is selected for the value of tile PTI on a subframe, multiplexing the PTI and the different RI from the last RI to generate a multiplex signal;

transmitting the multiplex signal to the radio base station apparatus by the physical uplink control channel; and in the radio base station apparatus, using the virtual PMI to match the different RI from the last RI is fed and the last RI and wideband first PMI that were fed back, to generate a precoding weight.

* * * * *